(12) United States Patent
Kim et al.

(10) Patent No.: US 12,411,368 B2
(45) Date of Patent: Sep. 9, 2025

(54) OPTICAL PHASE SHIFTER USING KTN (KTaNbO3) AND MANUFACTURING METHOD THEREOF

(71) Applicant: INDUSTRY-UNIVERSITY COOPERATION FOUNDATION HANYANG UNIVERSITY ERICA CAMPUS, Ansan-Si (KR)

(72) Inventors: Young Hyun Kim, Ansan-si (KR); Seong Ui An, Ansan-si (KR)

(73) Assignee: INDUSTRY-UNIVERSITY COOPERATION FOUNDATION HANYANG UNIVERSITY ERICA CAMPUS, Ansan-Si (KR)

( * ) Notice: Subject to any disclaimer, the term of this patent is extended or adjusted under 35 U.S.C. 154(b) by 335 days.

(21) Appl. No.: 18/154,066

(22) Filed: Jan. 13, 2023

(65) Prior Publication Data
US 2023/0229031 A1  Jul. 20, 2023

(30) Foreign Application Priority Data
Jan. 20, 2022  (KR) ......................... 10-2022-0008677

(51) Int. Cl.
*G02B 6/122* (2006.01)
*G02B 6/12* (2006.01)
(Continued)

(52) U.S. Cl.
CPC ............. *G02F 1/035* (2013.01); *G02B 6/122* (2013.01); *G02F 1/025* (2013.01); *G02F 1/212* (2021.01);
(Continued)

(58) Field of Classification Search
CPC ................. G02B 6/122; G02B 6/136; G02B 2006/12061; G02B 2006/12097;
(Continued)

(56) References Cited

U.S. PATENT DOCUMENTS 6,792,189 B2 * 9/2004 Sasaura .................. G02F 1/035
117/948
7,492,975 B2  2/2009 Toyoda et al.
(Continued)

FOREIGN PATENT DOCUMENTS

JP 2019-049612 A2 3/2019
KR 10-2005-0093764 A 9/2005

OTHER PUBLICATIONS

U.S. Appl. No. 18/154,065, application filing date Jan. 13, 2023 (68 pages).

*Primary Examiner* — Ryan A Lepisto
(74) *Attorney, Agent, or Firm* — Finch & Maloney PLLC

(57) ABSTRACT

Provided is an optical phase shifter. The optical phase shifter includes: a silicon substrate; a cladding layer disposed on the silicon substrate; an intermediate film disposed on the cladding layer; a KTN (KTaNbO3) waveguide disposed on the intermediate film; a protective layer disposed on the intermediate film to cover the KTN waveguide; and first and second electrodes disposed on the intermediate film while being spaced apart from each other with the KTN waveguide interposed between the first and second electrodes, wherein a silicon waveguide is disposed inside the cladding layer while being spaced apart from the KTN waveguide with the intermediate film interposed between the silicon waveguide and the KTN waveguide.

8 Claims, 28 Drawing Sheets

(51) Int. Cl.
*G02F 1/025* (2006.01)
*G02F 1/035* (2006.01)
*G02F 1/21* (2006.01)
*G02F 1/225* (2006.01)
*G02B 6/136* (2006.01)

(52) U.S. Cl.
CPC .. *G02F 1/2257* (2013.01); *G02B 2006/12061* (2013.01); *G02B 2006/12097* (2013.01); *G02B 2006/12142* (2013.01); *G02B 2006/12176* (2013.01); *G02B 6/136* (2013.01)

(58) Field of Classification Search
CPC ........... G02B 2006/12142; G02B 2006/12176; G02F 1/025; G02F 1/035; G02F 1/212; G02F 1/2257
See application file for complete search history.

(56) References Cited

U.S. PATENT DOCUMENTS

| | | | |
|---|---|---|---|
| 11,009,727 B2* | 5/2021 | Eltes | G02F 1/035 |
| 11,054,675 B2 | 7/2021 | Fujikata et al. | |
| 2006/0008223 A1 | 1/2006 | Gunn, III et al. | |
| 2013/0126941 A1 | 5/2013 | Zhu et al. | |
| 2018/0011347 A1 | 1/2018 | Ishikura | |
| 2019/0011799 A1 | 1/2019 | Yu et al. | |
| 2020/0257180 A1 | 8/2020 | Mahgerefteh et al. | |
| 2021/0278708 A1* | 9/2021 | Kumar | G02F 1/225 |
| 2021/0341766 A1 | 11/2021 | Chern | |
| 2021/0373363 A1 | 12/2021 | Zhou et al. | |

* cited by examiner

OPTICAL PHASE SHIFTER USING KTN (KTaNbO3) AND MANUFACTURING METHOD THEREOF

CROSS-REFERENCE TO RELATED APPLICATION

This application claims the benefit of Republic of Korea Patent Application 10-2022-0008677 (filed 20 Jan. 2022), the entire disclosure of which is hereby incorporated by reference herein.

BACKGROUND OF THE INVENTION

1. Field of the Invention

The present invention relates to an optical phase shifter and a manufacturing method therefor, and more particularly, to an optical phase shifter using KTN (KTaNbO$_3$) and a manufacturing method therefor.

This research was supported by the Technology Innovation Program (20015909) through the Korea Evaluation Institute of Industrial Technology (KEIT), funded by the Ministry of Trade, Industry & Energy (MOTIE, Korea).

This work was supported by the National Research Foundation of Korea(NRF) grant funded by the Korea government(MSIT) (No. 2022K1A3A1A79090726).

This research was supported by Korea Basic Science Institute (National research Facilities and Equipment Center) grant funded by the Ministry of Education (2021R1A6C101A405).

2. Description of the Related Art

FIG. 1 is a plan view showing a Mach-Zehnder optical modulator according to the related art, and FIG. 2 is a plan view showing a ring modulator according to the related art. An optical phase shifter will be described with reference to FIGS. 1 and 2.

A Mach-Zehnder optical modulator may use a Mach-Zehnder interferometer. The Mach-Zehnder interferometer refers to a device used to split a light from a single source into two waveguides and determine a phase difference between beams derived through the waveguides different from each other. The Mach-Zehnder optical modulator may include optical phase shifters 10 in two arms into which the light is divided.

Meanwhile, a ring modulator refers to an optical modulator using a resonance phenomenon of a ring, and the ring modulator may generally include an optical waveguide that forms a loop. In detail, the ring modulator may be configured such that resonance occurs when a length of an optical path exactly matches a specific wavelength, and only a light having the specific wavelength passes through an optical phase shifter 10 having a ring shape through the resonance as a light passes through the waveguide.

As described above, the optical phase shifter refers to a device used in an optical modulator, and the optical phase shifter may have a function of controlling a phase of a light through a change of a refractive index of a material. According to the related art, lithium niobate (LiNbO$_3$, LN) and barium titanate (BaTiO$_3$, BTO) have been used in optical phase shifters based on electro-optic effects. However, LN and BTO have may have low electro-optic effects. Accordingly, various researches on optical phase shifters with improved electro-optical effects have been conducted.

SUMMARY OF THE INVENTION

One technical object of the present invention is to provide an optical phase shifter using KTN (KTaNbO$_3$) and a manufacturing method therefor.

Another technical object of the present invention is to provide an optical phase shifter to which KTN is applied by a silicon-based process, and a manufacturing method therefor.

Still another technical object of the present invention is to provide an optical phase shifter and a manufacturing method therefor, capable of improving a light phase control efficiency.

Yet another technical object of the present invention is to provide an optical phase shifter and a manufacturing method therefor, capable of improving an optical modulation efficiency of an optical modulator.

Technical objects of the present invention are not limited to the above-described technical objects.

To achieve the technical objects described above, according to the present invention, there is provided an optical phase shifter.

According to one embodiment, the optical phase shifter includes: a silicon substrate; a cladding layer disposed on the silicon substrate; an intermediate film disposed on the cladding layer; a KTN (KTaNbO$_3$) waveguide disposed on the intermediate film; a protective layer disposed on the intermediate film to cover the KTN waveguide; and first and second electrodes disposed on the intermediate film while being spaced apart from each other with the KTN waveguide interposed between the first and second electrodes, wherein a silicon waveguide is disposed inside the cladding layer while being spaced apart from the KTN waveguide with the intermediate film interposed between the silicon waveguide and the KTN waveguide.

According to one embodiment, when a voltage is applied to the optical phase shifter, an electric field may be formed between the first electrode and the second electrode, a refractive index of the KTN waveguide may be changed by the electric field, and a phase of a light passing through the KTN waveguide may be controlled by the change of the refractive index.

According to one embodiment, all of the silicon substrate, the silicon waveguide, and the KTN waveguide may extend in a first direction, and an area of the silicon waveguide may be changed in the first direction.

According to one embodiment, the area of the silicon waveguide may be changed so as to be gradually narrowed or gradually widened in the first direction.

According to one embodiment, the optical phase shifter may further include: a first transition region that is adjacent to an optical input of an optical modulator; a second transition region that is adjacent to an optical output of the optical modulator; and a KTN region disposed between the first transition region and the second transition region, wherein an area of the silicon waveguide in the first transition region and the second transition region may be wider than an area of the silicon waveguide in the KTN region.

According to one embodiment, in the KTN region, the silicon waveguide may not be present inside the cladding layer.

According to one embodiment, the first transition region may include a first-first transition region that is adjacent to the optical input and a first-second transition region that is adjacent to the KTN region, and an area of the silicon waveguide in the first-first transition region may be wider than an area of the silicon waveguide in the first-second transition region.

According to one embodiment, the second transition region may include a second-first transition region that is adjacent to the optical output and a second-second transition region that is adjacent to the KTN region, and an area of the silicon waveguide in the second-first transition region may be wider than an area of the silicon waveguide in the second-second transition region.

According to one embodiment, the first electrode and the second electrode may pass through the protective layer in a thickness direction while being spaced apart from the KTN waveguide, the first electrode may be adjacent to one side of the KTN waveguide, and the second electrode may be adjacent to an opposite side of the KTN waveguide.

According to one embodiment, the optical phase shifter may operate in a transverse electric (TE) mode among the transverse electric (TE) mode and a transverse magnetic (TM) mode.

According to another embodiment, the optical phase shifter includes: a KTN (KTaNbO$_3$) waveguide; an amorphous silicon waveguide disposed on the KTN waveguide; a first electrode disposed on the KTN waveguide while being spaced apart from one side of the amorphous silicon waveguide; and a second electrode disposed on the KTN waveguide while being spaced apart from an opposite side of the amorphous silicon waveguide, wherein a refractive index of the KTN waveguide is changed by an electric field formed between the first electrode and the second electrode, and a phase of a light passing through the KTN waveguide is controlled by the change of the refractive index.

To achieve the technical objects described above, according to the present invention, there is provided a method for manufacturing an optical phase shifter.

According to one embodiment, the method for manufacturing the optical phase shifter includes: preparing a substrate structure including a silicon substrate, a cladding layer disposed on the silicon substrate, an intermediate film disposed on the cladding layer, and a silicon (Si) waveguide disposed inside the cladding layer to make contact with the intermediate film; preparing a KTN (KTaNbO$_3$) substrate in which a cutting line is formed in a width direction; bonding the substrate structure to the KTN substrate such that the KTN substrate makes contact with the intermediate film; removing a lower region of the cutting line of the KTN substrate to allow a KTN thin film configured with an upper region of the cutting line to remain on the substrate structure; forming a KTN waveguide spaced apart from the silicon waveguide with the intermediate film interposed between the KTN waveguide and the silicon waveguide by etching the KTN thin film to expose a region of the intermediate film except for a central portion of the intermediate film; forming a protective layer covering the KTN waveguide on the intermediate film; and foiling first and second electrodes passing through the protective layer while being spaced apart from each other with the KTN waveguide interposed between the first and second electrodes.

According to one embodiment, the preparing of the KTN substrate in which the cutting line is formed may include: preparing the KTN substrate; depositing a hard mask on the KTN substrate; and implanting ions into the KTN substrate on which the hard mask is deposited.

According to one embodiment, an area of the silicon waveguide is gradually decreased and gradually increased in a length direction.

According to an embodiment of the present invention, the optical phase shifter may include: a silicon substrate; a cladding layer disposed on the silicon substrate; an intermediate film disposed on the cladding layer; a KTN (KTaNbO$_3$) waveguide disposed on the intermediate film; a protective layer disposed on the intermediate film to cover the KTN waveguide; and first and second electrodes disposed on the intermediate film while being spaced apart from each other with the KTN waveguide interposed between the first and second electrodes, wherein a silicon waveguide is disposed inside the cladding layer while being spaced apart from the KTN waveguide with the intermediate film interposed between the silicon waveguide and the KTN waveguide. In addition, an area of the silicon waveguide may be changed so as to be gradually decreased and gradually increased in a first direction in which the silicon waveguide extends. Accordingly, a light phase control efficiency for a light passing through the optical phase shifter can be improved.

In addition, the optical phase shifter may use KTN (KTaNbO$_3$) having a larger electro-optical coefficient as compared with a conventional optical phase shifter in which lithium niobate (LiNbO$_3$, LN) or barium titanate (BaTiO$_3$, BTO) is used, so that a modulation efficiency of an optical modulator can be improved.

DETAILED DESCRIPTION OF THE INVENTION

Figure 1:
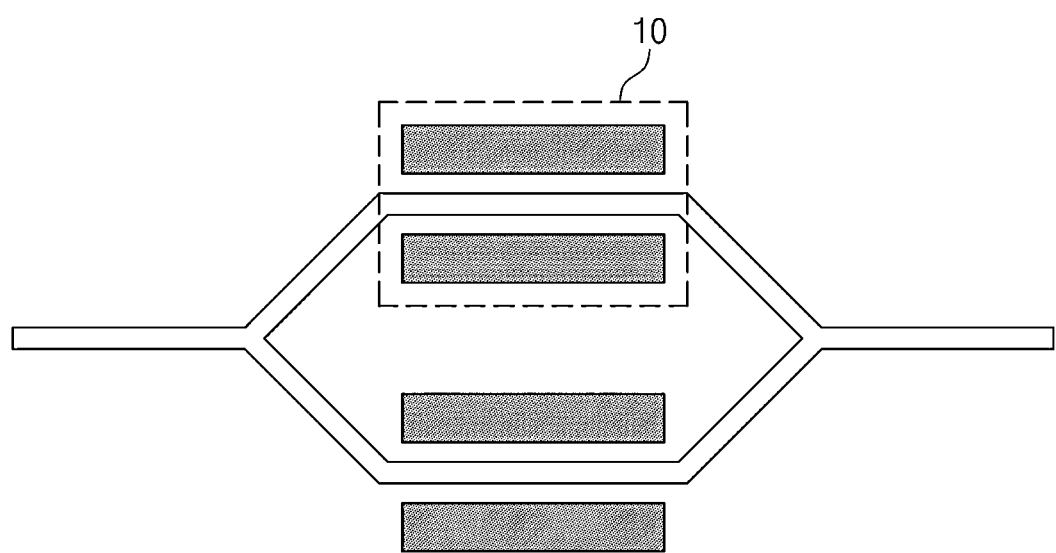
FIG. 1 is a plan view showing a Mach-Zehnder optical modulator according to the related art.
Figure 2:
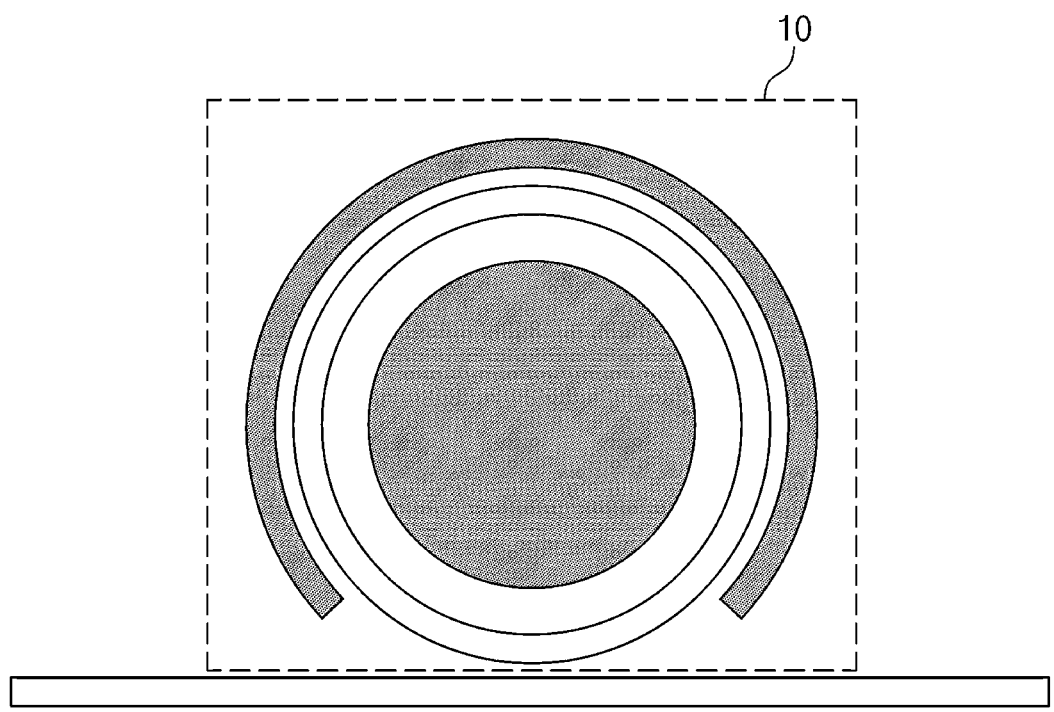
FIG. 2 is a plan view showing a ring modulator according to the related art.

Hereinafter, exemplary embodiments of the present invention will be described in detail with reference to the accompanying drawings. However, the technical idea of the present invention is not limited to the embodiments described herein, but may be realized in different forms. The embodiments introduced herein are provided to sufficiently deliver the idea of the present invention to those skilled in the art so that the disclosed contents may become thorough and complete.

When it is mentioned in the present disclosure that one element is on another element, it means that one element may be directly famed on another element, or a third element may be interposed between one element and another element. Further, in the drawings, thicknesses of films and regions are exaggerated for effective description of the technical contents.

In addition, in various embodiments of the present disclosure, the terms such as first, second, and third are used to describe various elements, but the elements are not limited by the terms. The terms are used only to distinguish one element from another element. Therefore, an element mentioned as a first element in one embodiment may be mentioned as a second element in another embodiment. The embodiments described and illustrated herein include their complementary embodiments. Further, the term "and/or" used herein is used to include at least one of the elements enumerated before and after the term.

As used herein, expressions in a singular form include a meaning of a plural form unless the context clearly indicates otherwise. Further, the terms such as "including" and "having" are intended to designate the presence of features, numbers, steps, elements, or combinations thereof described in the present disclosure, and shall not be construed to preclude any possibility of the presence or addition of one or more other features, numbers, steps, elements, or combinations thereof. In addition, the term "connection" used herein is used to include both indirect and direct connections of a plurality of elements.

Further, in the following description of the present invention, detailed descriptions of known functions or configurations incorporated herein will be omitted when they may make the gist of the present invention unnecessarily unclear.

Figure 3:
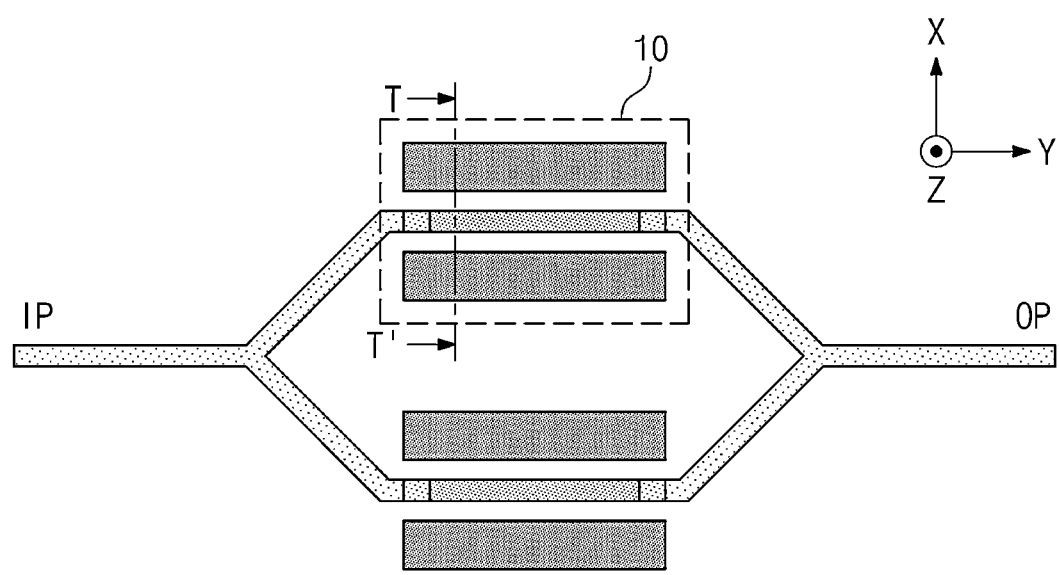
FIG. 3 is a plan view showing an optical modulator including an optical phase shifter according to a first embodiment of the present invention.
Figure 4:
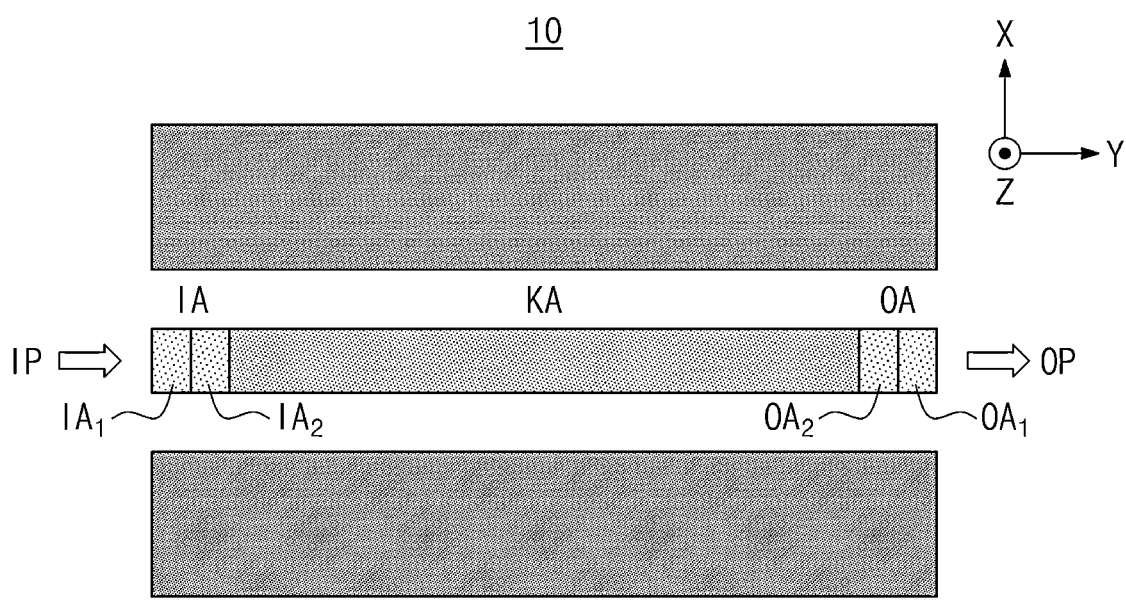
FIG. 4 is a plan view showing the optical phase shifter according to the first embodiment of the present invention.
Figure 5:
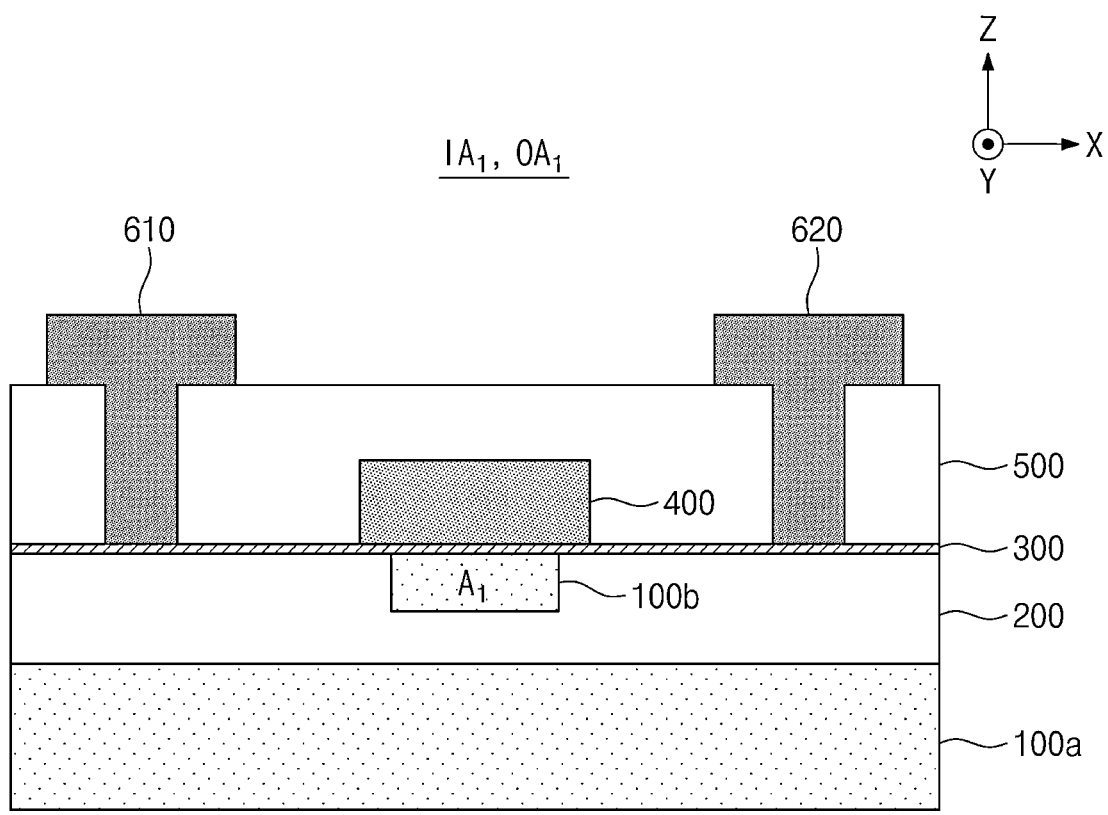
FIG. 5 is a sectional view showing the optical phase shifter in first-first and second-first transition regions.
Figure 6:
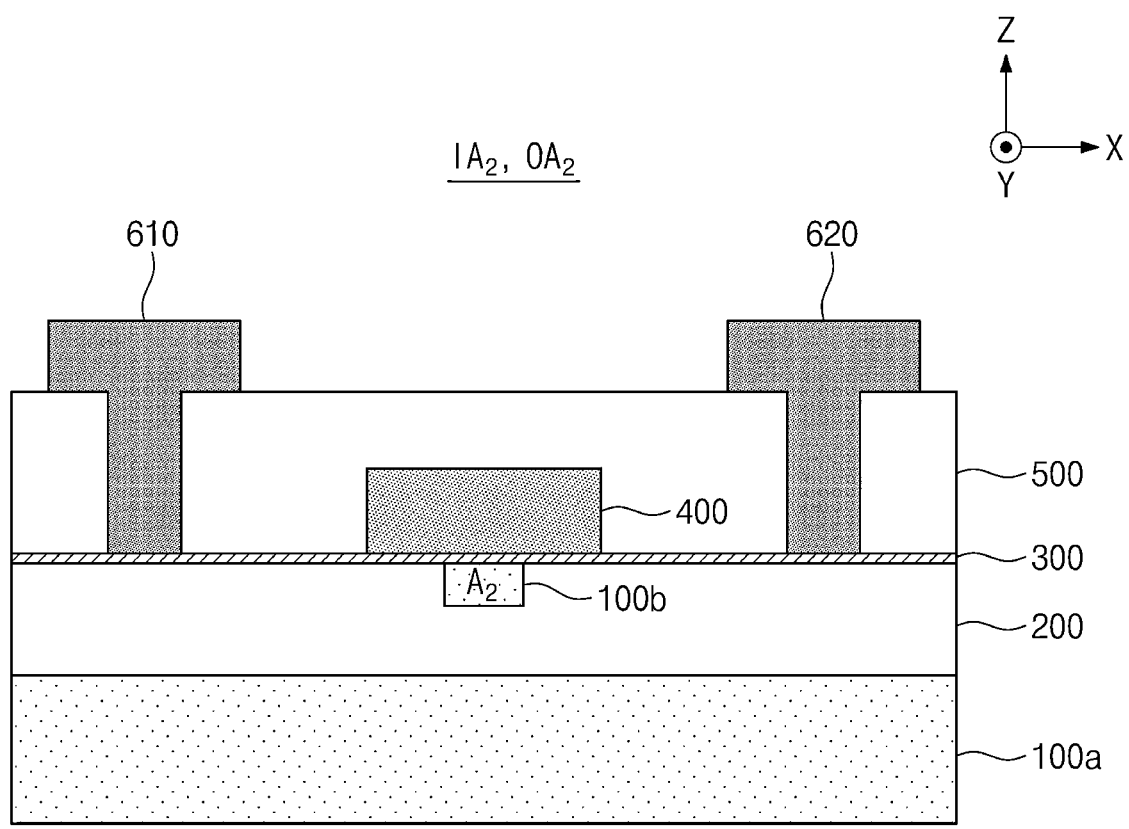
FIG. 6 is a sectional view showing the optical phase shifter in first-second and second-second transition regions.
Figure 7:
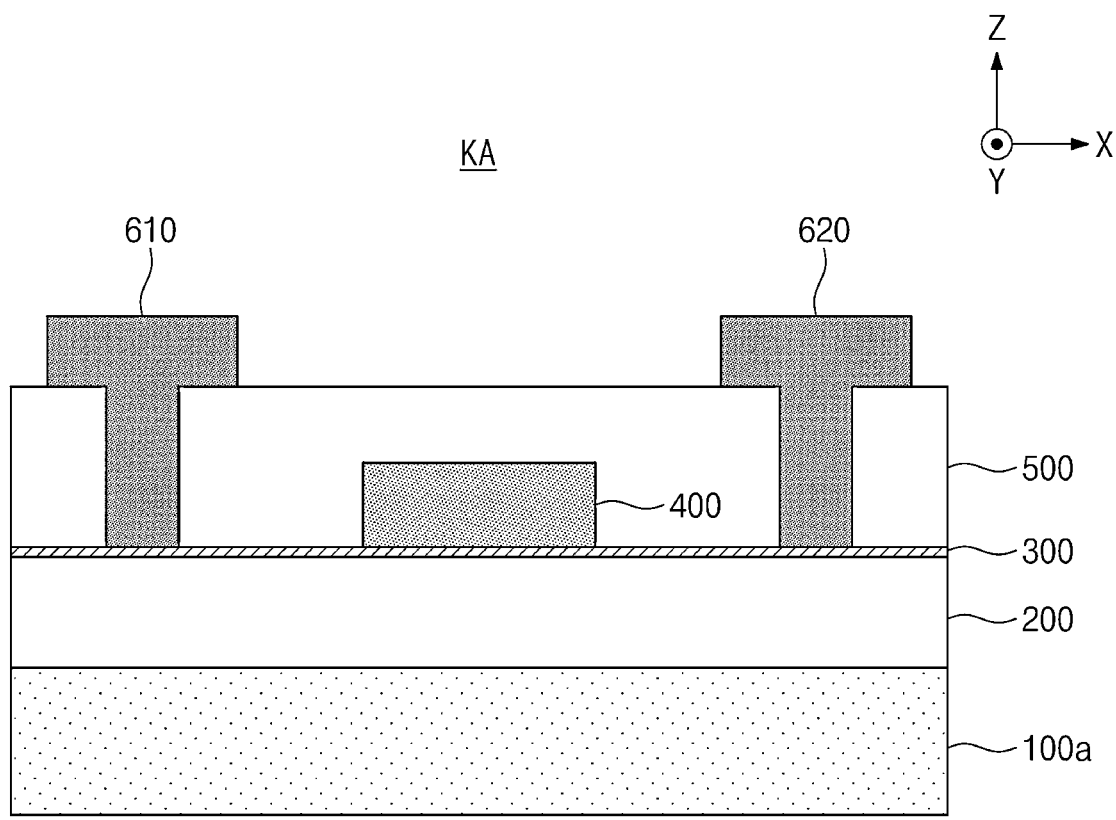
FIG. 7 is a sectional view showing the optical phase shifter in a KTN region.

FIG. 3 is a plan view showing an optical modulator including an optical phase shifter according to a first embodiment of the present invention, FIG. 4 is a plan view showing the optical phase shifter according to the first embodiment of the present invention, FIG. 5 is a sectional view showing the optical phase shifter in first-first and second-first transition regions, FIG. 6 is a sectional view showing the optical phase shifter in first-second and second-second transition regions, and FIG. 7 is a sectional view showing the optical phase shifter in a KTN region. The sectional views of FIGS. 5 to 7 show sections in a T-T' direction as shown in FIG. 3.

Although has been shown in FIG. 3 as an optical modulator including an optical phase shifter according to a first embodiment of the present invention, the optical phase shifter may also be applied to a ring modulator. In addition, the optical phase shifter may be applied to various optical modulators. A type of an optical modulator to which the optical phase shifter may be applied is not limited.

Referring to FIGS. 3 to 7, according to the first embodiment of the present invention, an optical phase shifter 10 may include a silicon substrate 100a, a silicon waveguide 100b, a cladding layer 200, an intermediate film 300, a KTN (KTaNbO$_3$) waveguide 400, a protective layer 500, a first electrode 610, and a second electrode 620. Hereinafter, each component will be described.

The silicon substrate 100a may constitute a base waveguide of an optical modulator. In other words, the optical phase shifter 10 according to an embodiment of the present invention may be manufactured through a silicon waveguide constituting the base waveguide of the optical modulator.

The cladding layer 200 may be disposed on the silicon substrate 100a. According to one embodiment, the cladding layer 200 may include silicon oxide (SiO$_2$). A silicon waveguide 100b may be disposed inside the cladding layer 200. In detail, the silicon waveguide 100b may be spaced apart from the KTN waveguide 400 that will be described below with the intermediate film 300 interposed between the silicon waveguide 100b and the KTN waveguide 400.

The intermediate film 300 may be disposed on the cladding layer 200. According to one embodiment, the intermediate film 300 may include a material having low surface roughness. For example, the intermediate film 300 may include aluminum oxide (Al$_2$O$_3$).

The KTN (KTaNbO$_3$) waveguide 400 and the protective layer 500 may be disposed on the intermediate film 300. In detail, the KTN waveguide 400 may be disposed on a central portion of the intermediate film 300, and the protective layer 500 may be disposed on the intermediate film 300 to cover the KTN waveguide 400.

The first electrode 610 and the second electrode 620 may pass through the protective layer 500 in a thickness direction. In addition, the first electrode 610 and the second electrode 620 may be spaced apart from the KTN waveguide 400, the first electrode 610 may be adjacent to one side of the KTN waveguide 400, and the second electrode 620 may be adjacent to an opposite side of the KTN waveguide 400.

When a voltage is applied to the optical phase shifter 10, an electric field may be formed between the first electrode 610 and the second electrode 620. Accordingly, a refractive index of the KTN waveguide 400 may be changed by the electric field, and a phase of a light passing through the KTN waveguide 400 may be controlled by the change of the refractive index.

The optical phase shifter 10 may be configured such that an area of the silicon waveguide 100b is changed. According to one embodiment, the silicon waveguide 100b may extend in a first direction, and the area of the silicon waveguide 100b may be changed in the first direction. For example, the area of the silicon waveguide 100b may be changed so as to be gradually decreased and gradually increased in the first direction. The first direction may be a Y-axis direction shown in FIGS. 3 to 7.

In more detail, the optical phase shifter 10 may include: a first transition region IA that is adjacent to an optical input IP of the optical modulator; a second transition region OA that is adjacent to an optical output OP of the optical modulator; and a KTN region KA disposed between the first transition region IA and the second transition region OA.

In addition, the first transition region IA may include a first-first transition region $IA_1$ that is adjacent to the optical input IP and a first-second transition region $IA_2$ that is adjacent to the KTN region KA. The second transition region OA may include a second-first transition region $OA_1$ that is adjacent to the optical output OP and a second-second transition region $OA_2$ that is adjacent to the KTN region KA.

An area $A_1$ of the silicon waveguide 100b in the first-first transition region $IA_1$ may be wider than an area $A_2$ of the silicon waveguide 100b in the first-second transition region $IA_2$. An area $A_1$ of the silicon waveguide 100b in the second-first transition region $OA_1$ may be wider than an area $A_2$ of the silicon waveguide 100b in the second-second transition region $OA_2$.

Unlike the first transition region IA and the second transition region OA, in the KTN region KA, the silicon waveguide 100b may not be present inside the cladding layer 200.

As described above, since the area of the silicon waveguide 100b is changed, a light passing through the optical phase shifter 10 may be focused on the KTN waveguide 400. Accordingly, a phase control effect of the optical phase shifter 10 may be improved. On the contrary, when the area of the silicon waveguide 100b is configured to be constant, the light passing through the optical phase shifter 10 may be dispersed into the KTN waveguide 400 and the silicon waveguide 100b. Accordingly, the phase control effect of the optical phase shifter 10 may be reduced.

In addition, when the silicon waveguide 100b is not present in the first transition region IA and the second transition region OA as well as the KTN region KA, a light traveling along the silicon substrate 100a constituting the base waveguide of the optical modulator may suddenly move to the KTN waveguide 400, so that various problems caused by a rapid change of a waveguide may occur.

According to the optical phase shifter 10, a performance of an element may be improved by allowing the KTN waveguide 400 and a light to interact with each other more. In addition, the performance of the component may be improved by an amount of a light spreading without being constrained by the KTN waveguide 400 becomes smaller. Accordingly, the optical phase shifter 10 may operate in a transverse electric (TE) mode among the transverse electric (TE) mode in which a light spreads to both sides of the KTN waveguide 400 as well as to the KTN waveguide 400 and a transverse magnetic (TM) mode in which a light spreads to upper and lower sides of the KTN waveguide 400 as well as to the KTN waveguide 400, so that the performance of the element may be improved. In addition, a spreading degree may be increased as a wavelength of the light becomes longer, so that the optical phase shifter 10 may use a light having a short wavelength to improve the performance of the element.

As a result, according to the first embodiment of the present invention, the optical phase shifter 10 may include: a silicon substrate 100a; a cladding layer 200 disposed on the silicon substrate 100a; an intermediate film 300 disposed on the cladding layer 200; a KTN ($KTaNbO_3$) waveguide 400 disposed on the intermediate film 300; a protective layer 500 disposed on the intermediate film 300 to cover the KTN waveguide 400; and first and second electrodes 610 and 620 disposed on the intermediate film 300 while being spaced apart from each other with the KTN waveguide 400 interposed between the first and second electrodes 610 and 620, wherein a silicon waveguide 100b is disposed inside the cladding layer 200 while being spaced apart from the KTN waveguide 400 with the intermediate film 300 interposed between the silicon waveguide 100b and the KTN waveguide 400. In addition, an area of the silicon waveguide 100b may be changed so as to be gradually decreased and gradually increased in a first direction (Y-axis direction) in which the silicon waveguide 100b extends. Accordingly, a light phase control efficiency for a light passing through the optical phase shifter 10 may be improved.

In addition, the optical phase shifter 10 may use KTN ($KTaNbO_3$) having a larger electro-optical coefficient as compared with a conventional optical phase shifter in which lithium niobate ($LiNbO_3$, LN) or barium titanate ($BaTiO_3$, BTO) is used, so that a modulation efficiency of an optical modulator may be improved.

Figure 8:
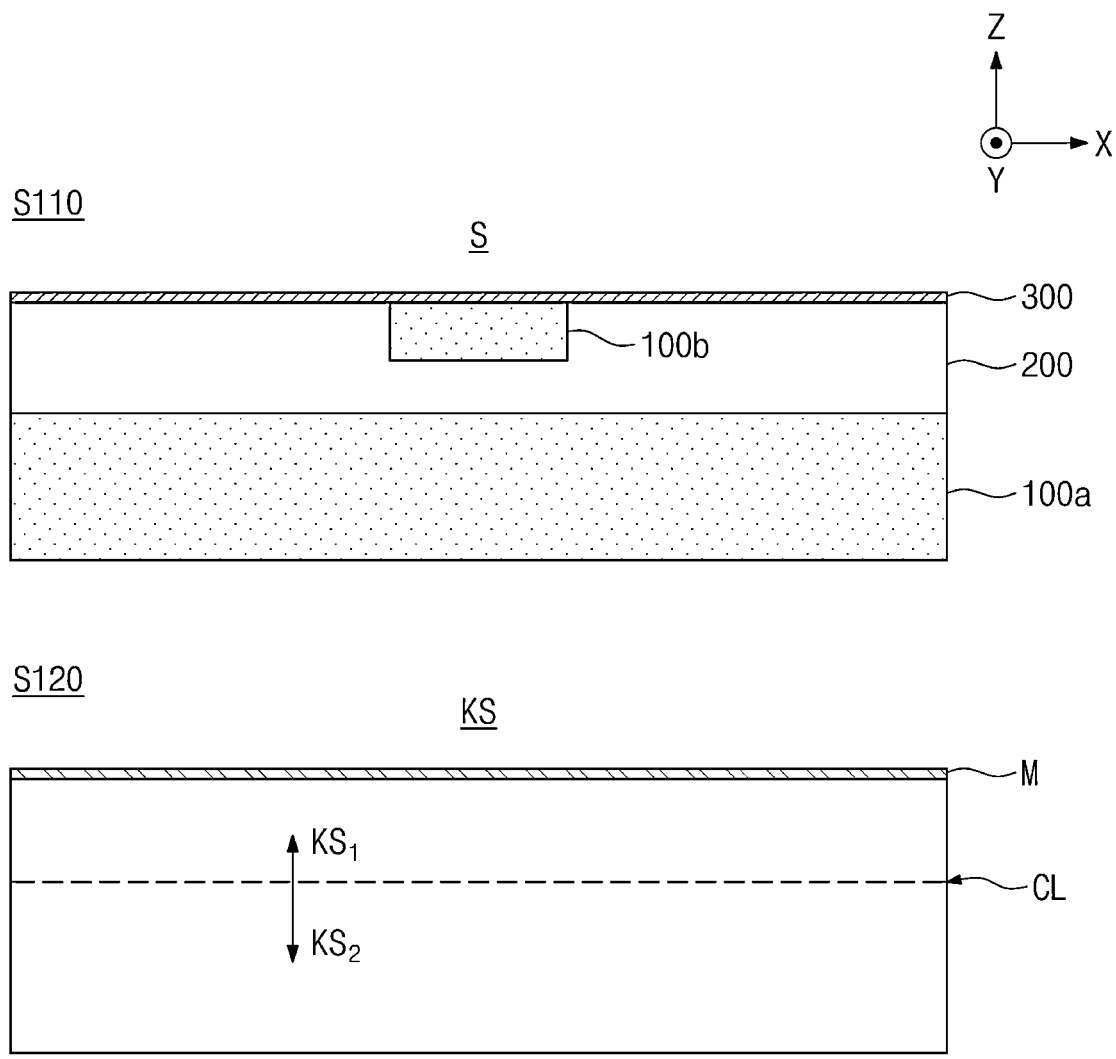
FIG. 8 is a view for describing steps S110 and S120 of a method for manufacturing the optical phase shifter according to the first embodiment of the present invention.
Figure 9:
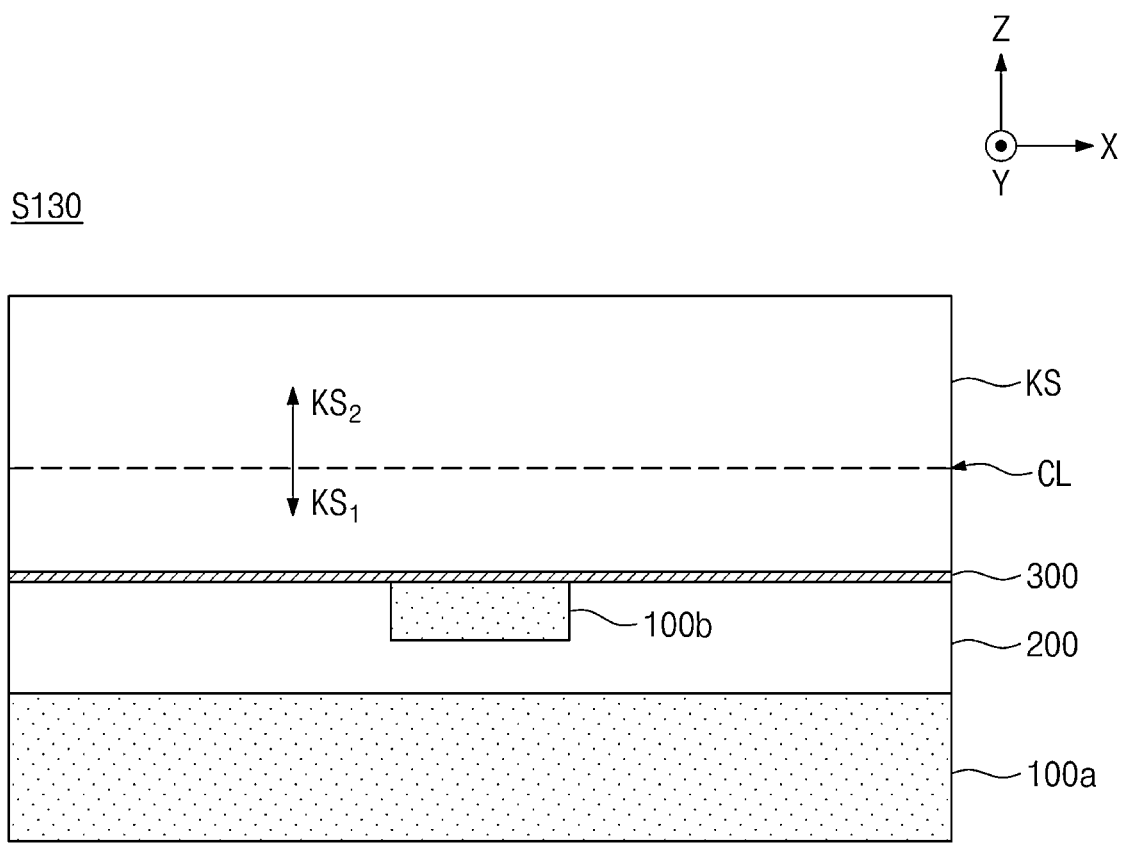
FIG. 9 is a view for describing a step S130 of the method for manufacturing the optical phase shifter according to the first embodiment of the present invention.
Figure 10:
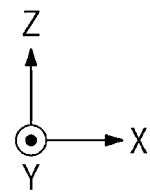
FIG. 10 is a view for describing a step S140 of the method for manufacturing the optical phase shifter according to the first embodiment of the present invention.
Figure 10:
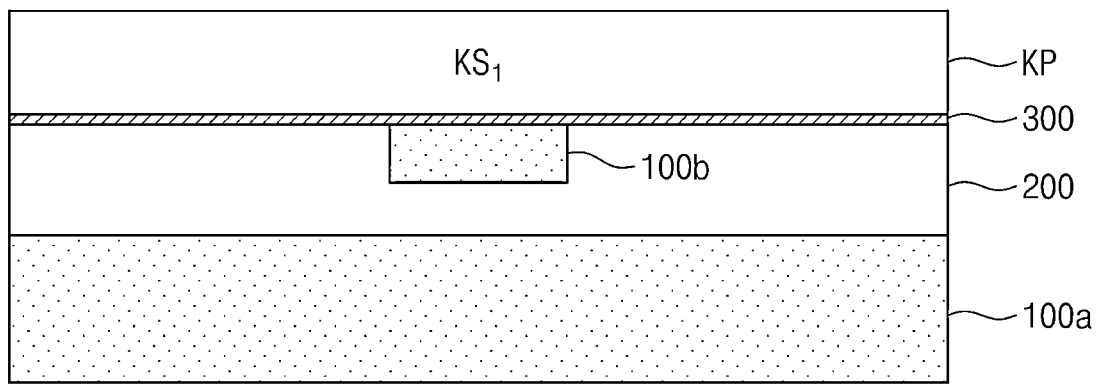
Figure 11:
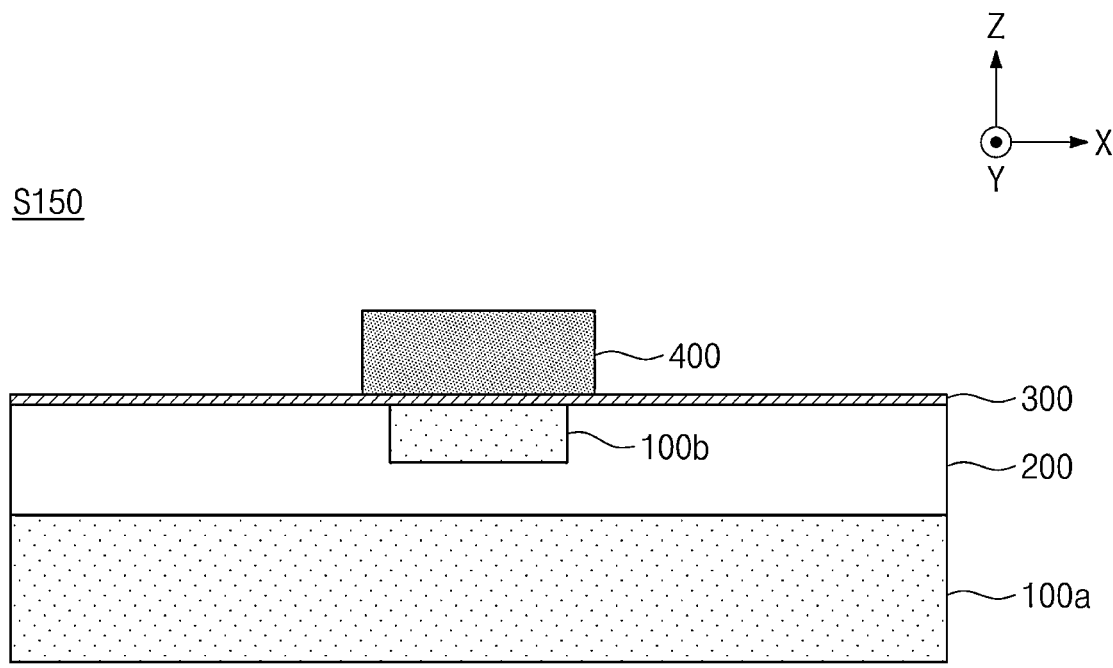
FIG. 11 is a view for describing a step S150 of the method for manufacturing the optical phase shifter according to the first embodiment of the present invention.
Figure 12:
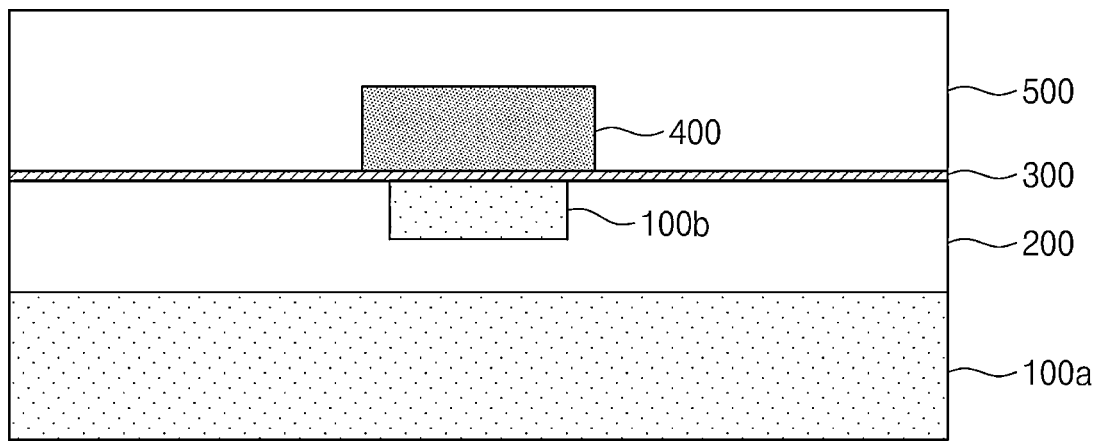
FIG. 12 is a view for describing a step S160 of the method for manufacturing the optical phase shifter according to the first embodiment of the present invention.
Figure 13:
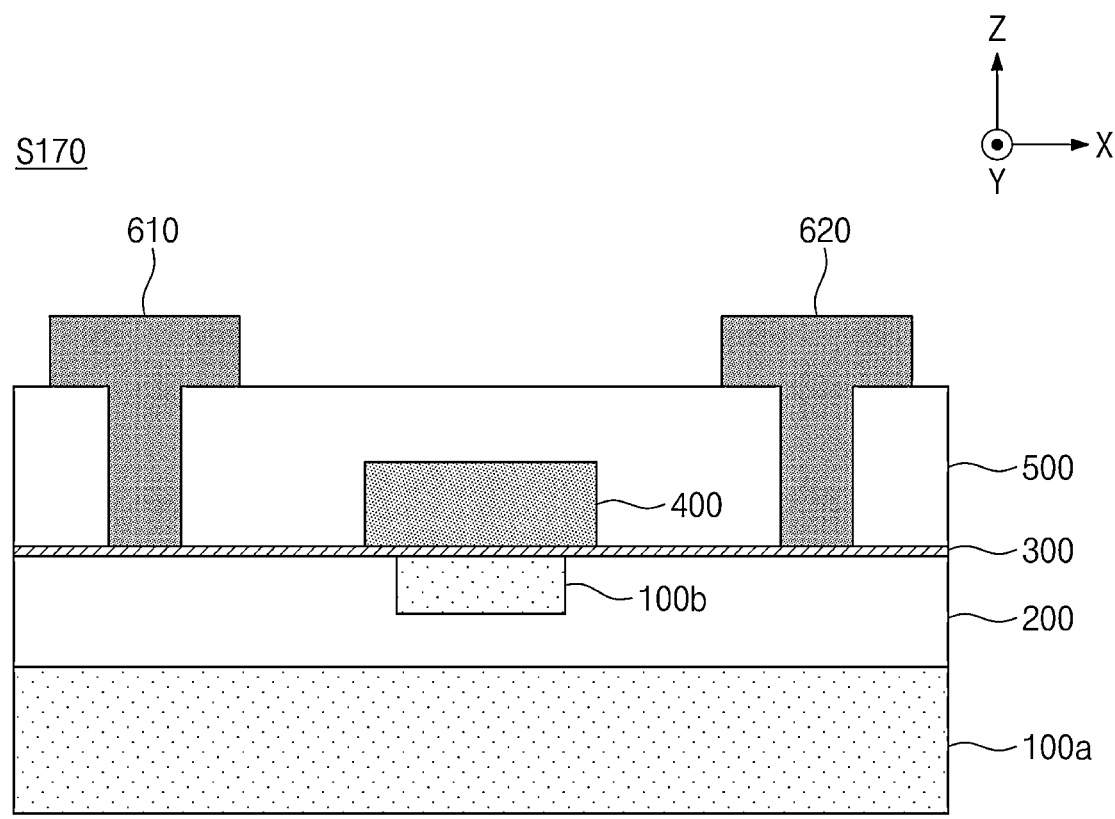
FIG. 13 is a view for describing a step S170 of the method for manufacturing the optical phase shifter according to the first embodiment of the present invention.

FIG. 8 is a view for describing steps S110 and S120 of a method for manufacturing the optical phase shifter according to the first embodiment of the present invention, FIG. 9 is a view for describing a step S130 of the method for manufacturing the optical phase shifter according to the first embodiment of the present invention, FIG. 10 is a view for describing a step S140 of the method for manufacturing the optical phase shifter according to the first embodiment of the present invention, FIG. 11 is a view for describing a step S150 of the method for manufacturing the optical phase shifter according to the first embodiment of the present invention, FIG. 12 is a view for describing a step S160 of the method for manufacturing the optical phase shifter according to the first embodiment of the present invention, and FIG. 13 is a view for describing a step S170 of the method for manufacturing the optical phase shifter according to the first embodiment of the present invention.

Referring to FIG. 8, a substrate structure S may be prepared (S110). According to one embodiment, the substrate structure (S) may include: a silicon substrate 100a; a cladding layer 200 disposed on the silicon substrate 100a; an intermediate film 300 disposed on the cladding layer 200; and a silicon waveguide 100b disposed inside the cladding layer 200. The silicon waveguide 100b may make contact with the intermediate film 300. According to one embodiment, an area of the silicon waveguide 100b may be gradually decreased and gradually increased in a length direction (Y-axis direction).

A KTN ($KTaNbO_3$) substrate KS in which a cutting line CL is formed may be prepared (S120). According to one embodiment, the preparing of the KTN substrate KS in which the cutting line CL is formed may include: preparing the KTN substrate (S121); depositing a hard mask M on the KTN substrate (S122); and implanting ions into the KTN substrate on which the hard mask M is deposited (S123). As the ions are implanted into the KTN substrate, the cutting line CL may be formed in the KTN substrate. After the cutting line CL is formed, the hard mask M may be removed. The hard mask M may reduce degradation of surface roughness of the KTN substrate caused by the ions implanted into the KTN substrate. An upper region of the cutting line CL in the KTN substrate KS may be defined as a first region $KS_1$, and a lower region of the cutting line CL in the KTN substrate KS may be defined as a second region $KS_2$.

Referring to FIG. 9, the substrate structure S and the KTN substrate KS may be bonded to each other such that the KTN substrate KS makes contact with the intermediate film 300 (S130). In more detail, the substrate structure S and the KTN substrate KS may be bonded to each other such that the first region $KS_1$ of the KTN substrate KS makes contact with the intermediate film 300. According to one embodiment, a material (e.g., $Al_2O_3$) having low surface roughness may be used as the intermediate film 300, so that bonding strength between the substrate structure S and the KTN substrate KS may be improved.

Referring to FIG. 10, a lower region (the second region $KS_2$) of the cutting line CL of the KTN substrate KS may be removed to allow a KTN thin film KP configured with an upper region (the first region $KS_1$) of the cutting line CL to remain on the substrate structure S (S140). According to one embodiment, the lower region (the second region $KS_2$) of the cutting line CL may be removed through an annealing process.

In other words, the KTN thin film KP may be formed on the substrate structure S through a smart cut scheme. In a case of KTN, KTN may have a lattice structure and a lattice constant that are significantly different from a lattice structure and a lattice constant of silicon (Si), so that it may be difficult to form a thin film on silicon (Si). However, when the smart cut scheme described above is used, a KTN thin film may be easily formed on silicon (Si).

Referring to FIG. 11, the KTN thin film KP may be etched to form a KTN waveguide 400 (S150). In more detail, the KTN thin film KP may be etched to expose a region of the intermediate film 300 except for a central portion of the intermediate film 300. Accordingly, the KTN waveguide 400 spaced apart from the silicon waveguide 100b with the intermediate film 300 interposed between the KTN waveguide 400 and the silicon waveguide 100b may be formed.

Referring to FIGS. 12 and 13, a protective layer 500 covering the KTN waveguide 400 may be famed on the intermediate film 300. Thereafter, first and second electrodes 610 and 620 passing through the protective layer 500 while being spaced apart from each other with the KTN waveguide 400 interposed between the first and second electrodes 610 and 620 may be formed. Accordingly, the optical phase shifter according to the first embodiment may be manufactured.

The optical phase shifter and the manufacturing method therefor according to the first embodiment of the present invention have been described above. Hereinafter, an optical phase shifter and a manufacturing method therefor according to a second embodiment of the present invention will be described.

Figure 14:
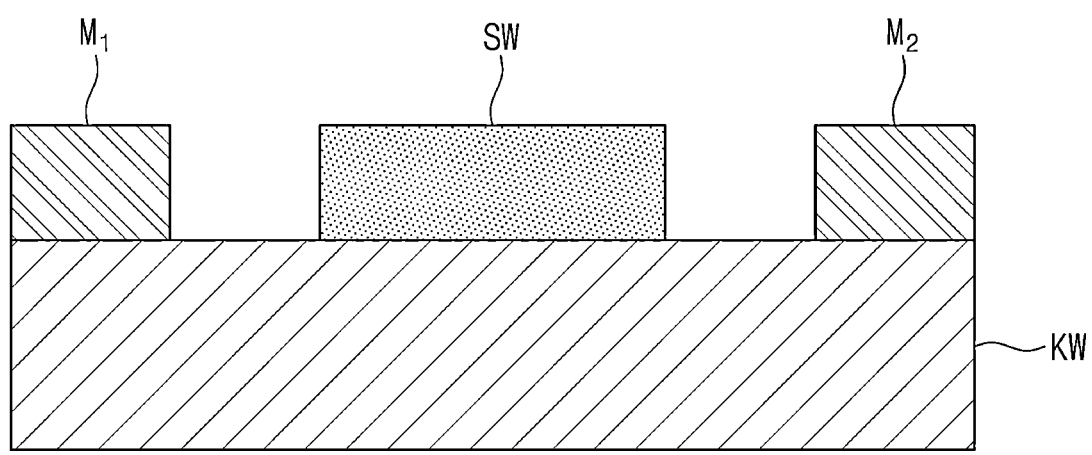
FIG. 14 is a view for describing an optical phase shifter according to a second embodiment of the present invention.

FIG. 14 is a view for describing an optical phase shifter according to a second embodiment of the present invention.

Referring to FIG. 14, according to the second embodiment of the present invention, the optical phase shifter may include: a KTN ($KTaNbO_3$) waveguide KW; an amorphous silicon waveguide SW disposed on the KTN waveguide KW; a first electrode $M_1$ disposed on the KTN waveguide KW while being spaced apart from one side of the amorphous silicon waveguide SW; and a second electrode $M_2$ disposed on the KTN waveguide KW while being spaced apart from an opposite side of the amorphous silicon waveguide SW.

According to the optical phase shifter of the second embodiment, a refractive index of the KTN waveguide KW may be changed by an electric field formed between the first electrode $M_1$ and the second electrode $M_2$, and a phase of a light passing through the KTN waveguide KW may be controlled by the change of the refractive index.

According to the second embodiment, the optical phase shifter may operate in a transverse electric (TE) mode among the transverse electric (TE) mode in which a light spreads to both sides of the KTN waveguide KW as well as to the KTN waveguide KW and a transverse magnetic (TM) mode in which a light spreads to upper and lower sides of the KTN waveguide KW as well as to the KTN waveguide KW, so that a performance of an element may be improved. In addition, the optical phase shifter 10 may use a light having a long wavelength to improve the performance of the element.

Figure 15:
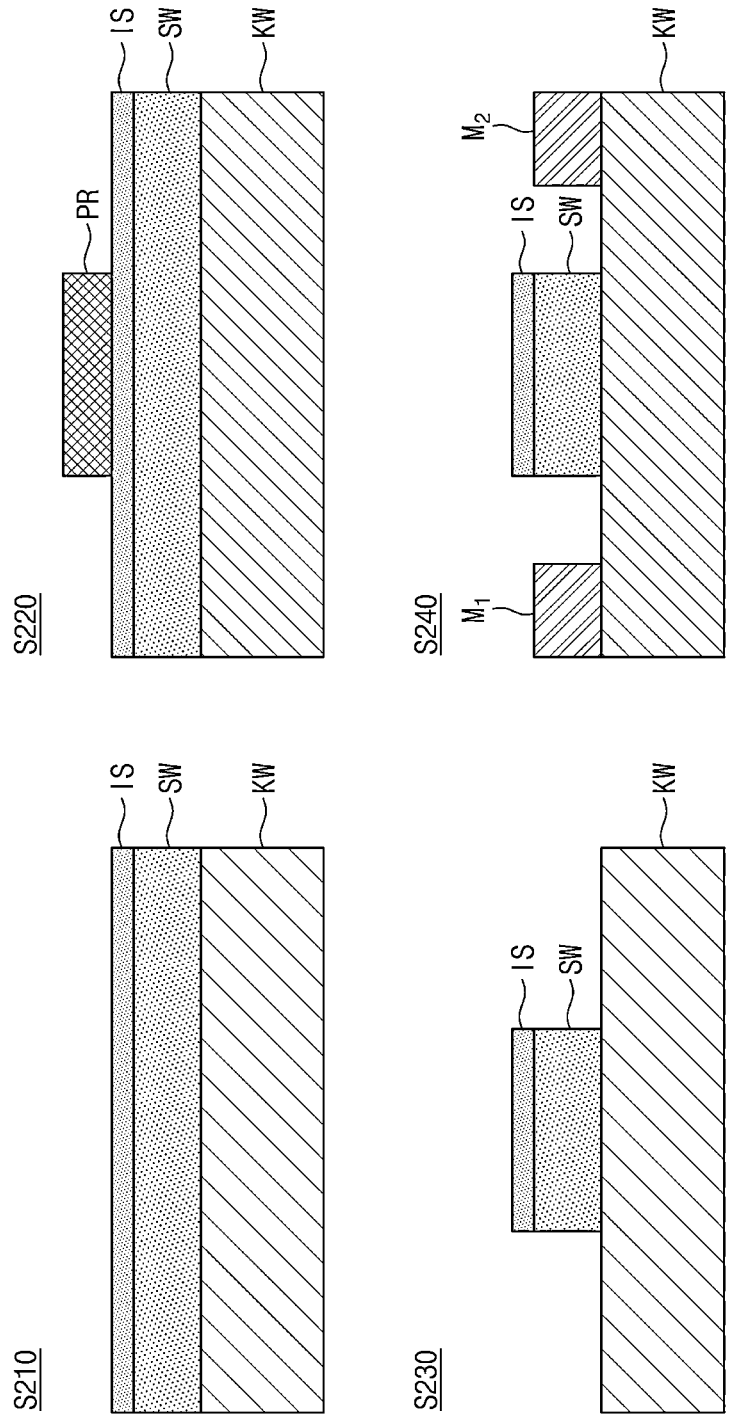
FIG. 15 is a view for describing a process of manufacturing the optical phase shifter according to the second embodiment of the present invention.

FIG. 15 is a view for describing a process of manufacturing the optical phase shifter according to the second embodiment of the present invention.

Referring to FIG. 15, after an amorphous silicon film SW is formed on the KTN waveguide KW, an insulating film IS may be formed on the amorphous silicon film SW (S210). According to one embodiment, the insulating film IS may include silicon oxide ($SiO_2$). In addition, the insulating film IS may be formed through wet oxidation.

A photoresist PR may be disposed on a central portion of the insulating film IS (S220). Thereafter, the insulating film IS and the amorphous silicon film SW may be etched through the photoresist PR (S230). Accordingly, a region of the KTN waveguide KW except for a central portion of the KTN waveguide KW may be exposed. The etched amorphous silicon film SW may be defined as an amorphous silicon waveguide SW. The amorphous silicon waveguide SW may have a width of 450 nm and a height of 400 nm.

A first electrode $M_1$ and a second electrode $M_2$ may be formed on the exposed KTN waveguide KW (S240). Finally, a lift-off process may be performed, and the insulating film IS remaining on the amorphous silicon waveguide SW may be removed. Accordingly, the optical phase shifter according to the second embodiment may be manufactured.

The optical phase shifter and the manufacturing method therefor according to the second embodiment of the present invention have been described above. Hereinafter, an optical phase shifter and a manufacturing method therefor according to a third embodiment of the present invention will be described.

Figure 16:
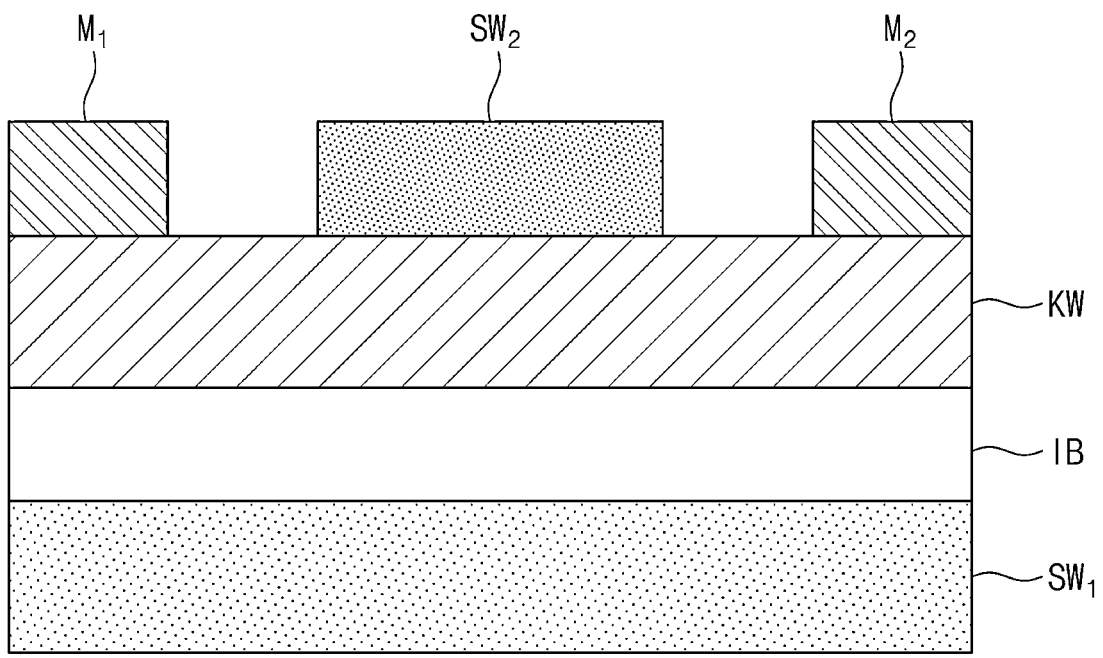
FIG. 16 is a view for describing an optical phase shifter according to a third embodiment of the present invention.

FIG. 16 is a view for describing an optical phase shifter according to a third embodiment of the present invention.

Referring to FIG. 16, according to the third embodiment of the present invention, the optical phase shifter may include: a base silicon waveguide $SW_1$; a cladding layer IB disposed on the base silicon waveguide $SW_1$; a KTN ($KTaNbO_3$) waveguide KW disposed on the cladding layer IB; an amorphous silicon waveguide $SW_2$ disposed on the KTN waveguide KW; a first electrode $M_1$ disposed on the KTN waveguide KW while being spaced apart from one side of the amorphous silicon waveguide $SW_2$; and a second electrode $M_2$ disposed on the KTN waveguide KW while being spaced apart from an opposite side of the amorphous silicon waveguide $SW_2$.

According to the optical phase shifter of the third embodiment, a refractive index of the KTN waveguide KW may be changed by an electric field formed between the first electrode $M_1$ and the second electrode $M_2$, and a phase of a light passing through the KTN waveguide KW may be controlled by the change of the refractive index.

According to the third embodiment, the optical phase shifter may operate in a transverse electric (TE) mode among the transverse electric (TE) mode in which a light spreads to both sides of the KTN waveguide KW as well as to the KTN waveguide KW and a transverse magnetic (TM) mode in which a light spreads to upper and lower sides of the KTN waveguide KW as well as to the KTN waveguide KW, so that a performance of an element may be improved. In addition, the optical phase shifter 10 may use a light having a long wavelength to improve the performance of the element.

Figure 17:
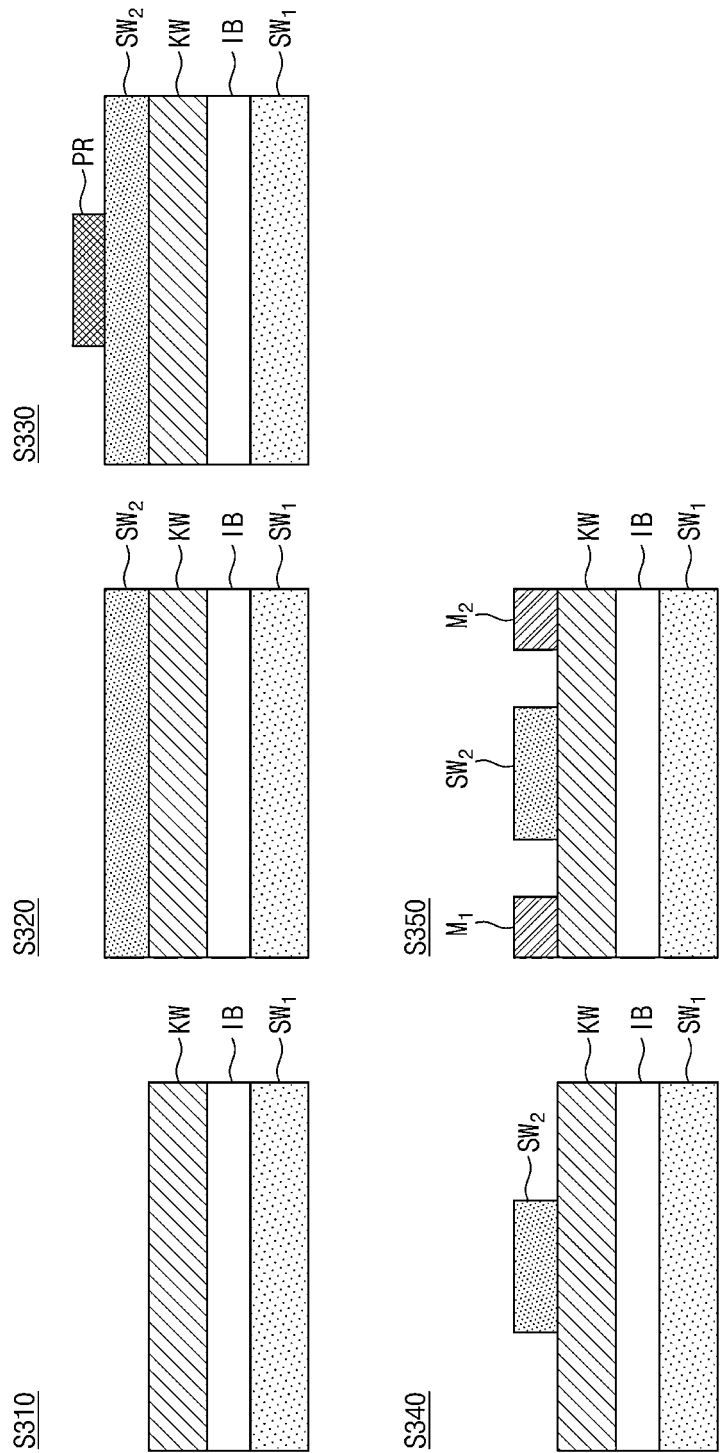
FIG. 17 is a view for describing a process of manufacturing the optical phase shifter according to the third embodiment of the present invention.

FIG. 17 is a view for describing a process of manufacturing the optical phase shifter according to the third embodiment of the present invention.

Referring to FIG. 17, after a structure in which the cladding layer IB is formed on the base silicon waveguide $SW_1$ is prepared, the KTN waveguide KW may be formed on the cladding layer IB (S310). According to one embodiment, the KTN waveguide KW may be formed in a smart cut scheme. Alternatively, according to another embodiment, the KTN waveguide KW may be formed through epitaxial growth.

An amorphous silicon film $SW_2$ may be formed on the KTN waveguide KW (S320). According to one embodiment, the amorphous silicon film $SW_2$ may have a thickness of 400 nm.

A photoresist PR may be disposed on a central portion of the amorphous silicon film $SW_2$ (S330). Thereafter, the amorphous silicon film $SW_2$ may be etched through the photoresist PR (S340). Accordingly, a region of the KTN waveguide KW except for a central portion of the KTN waveguide KW may be exposed. The etched amorphous silicon film $SW_2$ may be defined as an amorphous silicon waveguide $SW_2$. The amorphous silicon waveguide $SW_2$ may have a width of 450 nm.

The first electrode $M_1$ and the second electrode $M_2$ may be formed on the exposed KTN waveguide KW, and a lift-off process may be performed (S350). Accordingly, the optical phase shifter according to the third embodiment may be manufactured.

The optical phase shifters and the manufacturing methods therefor according to the embodiments of the present invention have been described above. Hereinafter, specific experimental examples and characteristic evaluation results of the optical phase shifters according to the embodiments of the present invention will be described.

Manufacture of Optical Phase Shifter According to Experimental Example 1

After a passive optical element such as a Si optical waveguide is fabricated on an SOI substrate, an intermediate film for bonding with a KTN substrate was deposited. After a hard mask is deposited on the KTN substrate, an ion implantation process was performed to form a cutting line.

The KTN substrate in which the cutting line is formed was turned over and bonded onto the SOI, and a lower region of the KTN substrate was removed through an annealing process. Accordingly, a KTN thin film configured with an upper region of the KTN substrate remained on the SOI substrate. Thereafter, a KTN waveguide was formed by using dry etching, and a protective layer and an electrode were formed.

Finally, an optical phase shifter having the structure described with reference to FIGS. 3 to 7 was manufactured.

Manufacture of Optical Phase Shifter According to Experimental Example 2

After amorphous silicon is deposited on a KTN substrate with a thickness of 400 nm, $SiO_2$ was formed through wet oxidation. In addition, PR coating for forming a rib part to have a width of 450 nm was performed, and PR patterning was performed. After a lithography process is performed, etching was performed, and PR stripping was performed. To form an electrode, the PR coating and the PR patterning were performed, and the electrode was deposited. Thereafter, a lift-off process was performed.

Finally, an optical phase shifter having the structure described with reference to FIG. 14 was manufactured.

Manufacture of Optical Phase Shifter According to Experimental Example 3

A KTN thin film was formed on a BOX/Si substrate (SOI) by using a smart cut scheme or an epitaxial growth scheme. Amorphous silicon was deposited on the KTN thin film with a thickness of 400 nm. In addition, PR coating for forming a rib part to have a width of 450 nm was performed, and PR patterning was performed. After a lithography process is performed, etching was performed, and PR stripping was performed. To form an electrode, the PR coating and the PR patterning were performed, and the electrode was deposited. Thereafter, a lift-off process was performed.

Finally, an optical phase shifter having the structure described with reference to FIG. 16 was manufactured.

Figure 18:
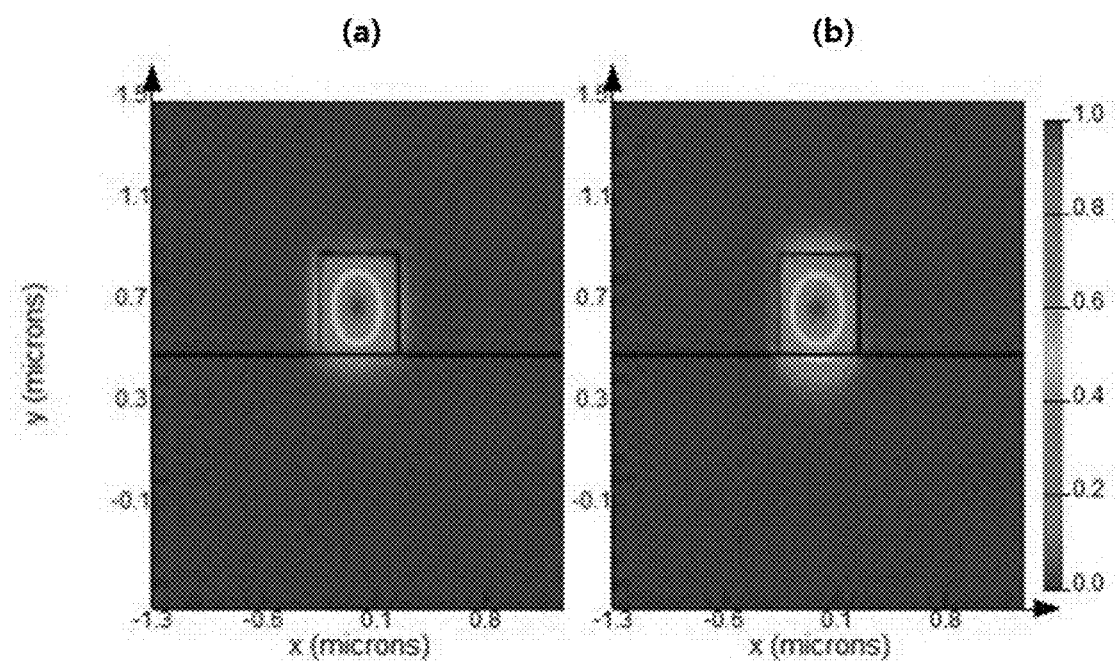
FIGS. 18 and 19 are views showing optical mode calculation results of an optical phase shifter according to Experimental Example 2 of the present invention.
Figure 19:
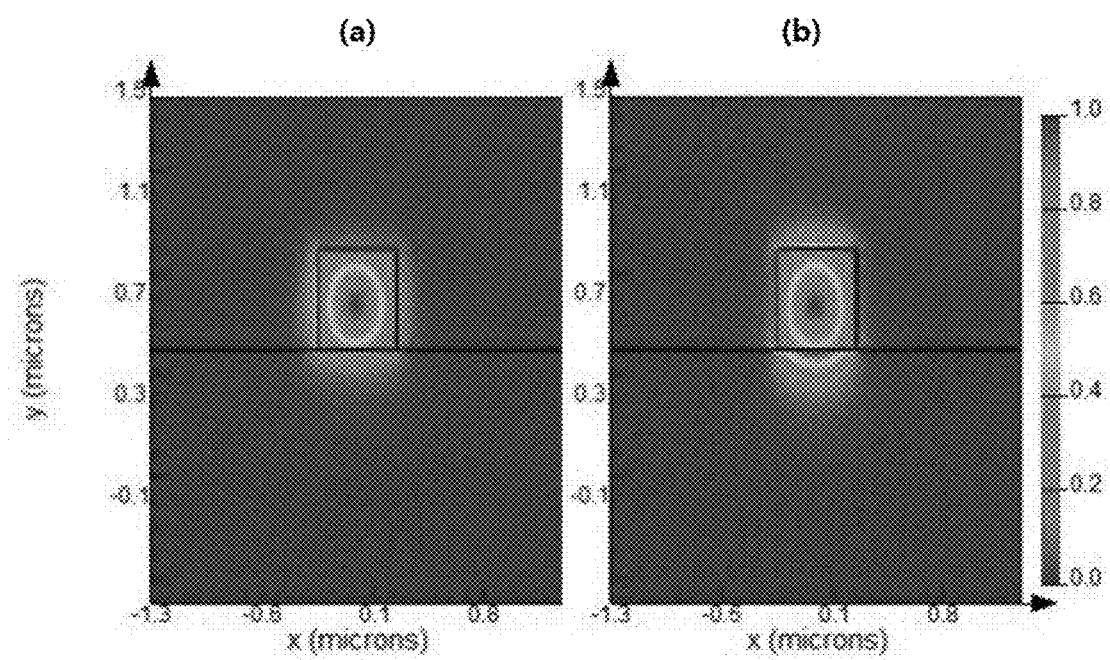

FIGS. 18 and 19 are views showing optical mode calculation results of an optical phase shifter according to Experimental Example 2 of the present invention.

Referring to FIGS. 18 and 19, after the optical phase shifter according to Experimental Example 2 is prepared, optical mode calculation results according to a wavelength are shown. In detail, FIGS. 18(a) and 19(a) show results of a transverse electric (TE) mode, and FIGS. 18(b) and 19(b) show results of a transverse magnetic (TM) mode. In addition, FIG. 18 shows results at a wavelength of 1.3 μm, and FIG. 19 shows results at a wavelength of 1.55 μm.

As shown in FIGS. 18 and 19, in a case of the optical phase shifter according to Experimental Example 2, it may be found that a light is constrained to a rib part of an optical waveguide. In a case of the TE mode, the light spreads to both sides of a rib as well as to the rib part, and in a case of the TM mode, the light spreads to upper and lower sides of the rib as well as to the rib part. In addition, a spreading degree of the light may be increased as a wavelength of the light becomes longer. A performance of an element may be improved by allowing the KTN waveguide and the light to interact with each other more. Accordingly, it may be found that the optical phase shifter according to Experimental Example 2 may use the TM mode rather than the TE mode to improve the performance of the element, and may use a light having a long wavelength rather than a light having a short wavelength to improve the performance of the element.

Figure 20:
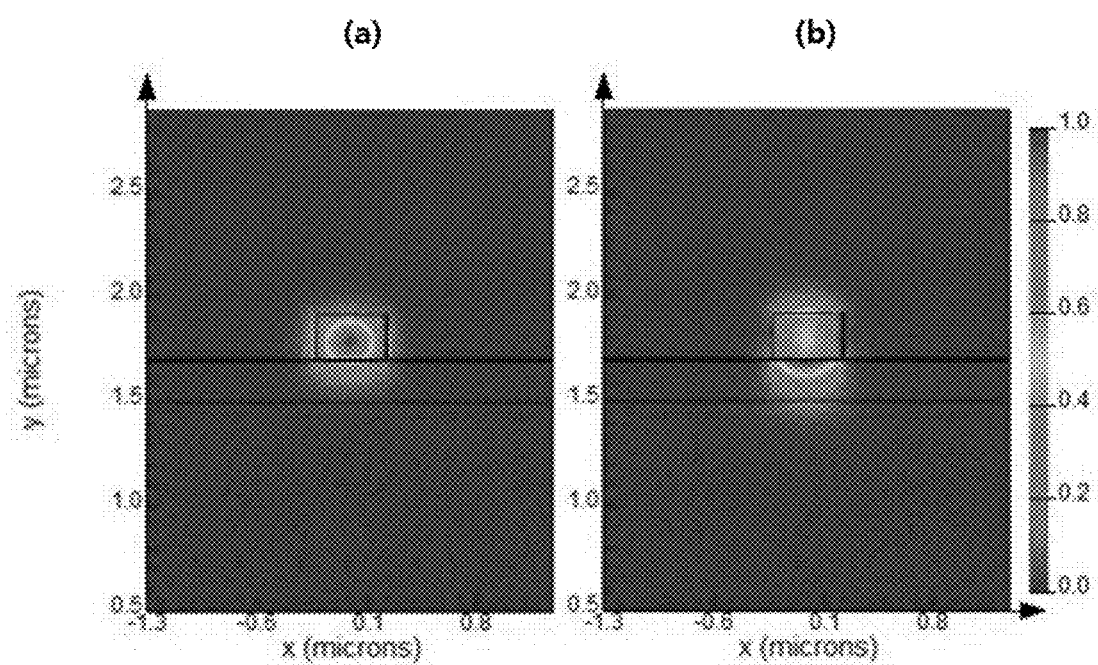
FIGS. 20 and 21 are views showing optical mode calculation results of an optical phase shifter according to Experimental Example 3 of the present invention.
Figure 21:
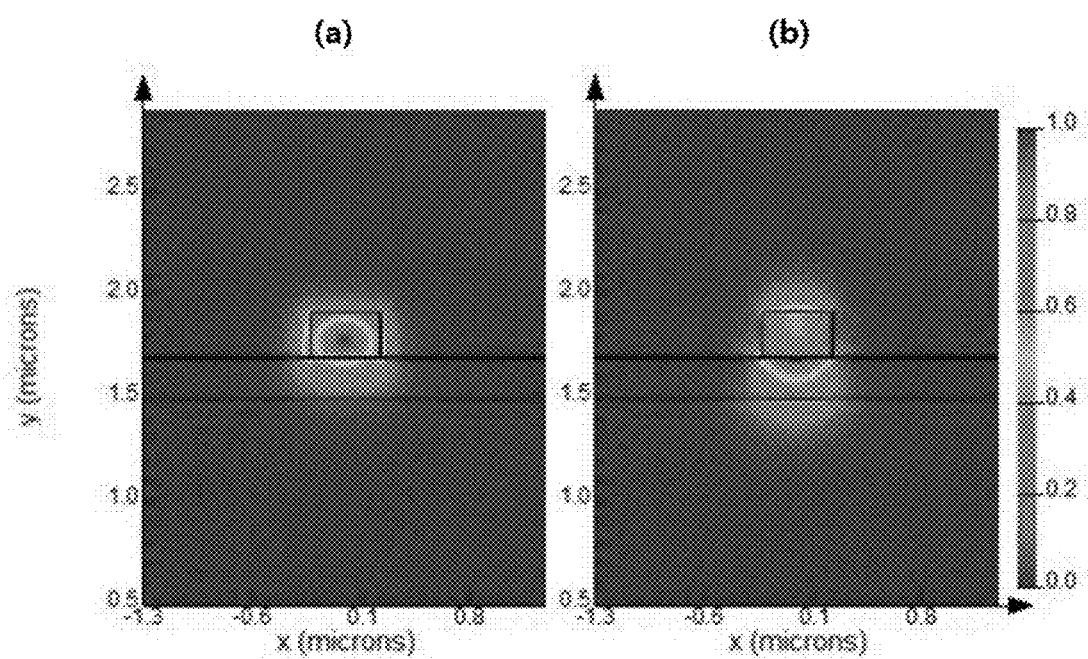

FIGS. 20 and 21 are views showing optical mode calculation results of an optical phase shifter according to Experimental Example 3 of the present invention.

Referring to FIGS. 20 and 21, after the optical phase shifter according to Experimental Example 3 is prepared, optical mode calculation results according to a wavelength are shown. In detail, FIGS. 20(a) and 21(a) show results of a transverse electric (TE) mode, and FIGS. 20(b) and 21(b) show results of a transverse magnetic (TM) mode. In addition, FIG. 20 shows results at a wavelength of 1.3 μm, and FIG. 21 shows results at a wavelength of 1.55 μm.

As shown in FIGS. 20 and 21, in a case of the TE mode, it may be found that a light is most constrained to a rib part, and the light spreads to both sides of a rib. In a case of the TM mode, it may be found that the light is most constrained to a KTN thin film that is adjacent to the rib, and the light spreads to upper and lower portions of the rib including the rib part. In addition, it may be found that a spreading degree of the light may be increased as a wavelength of the light becomes longer. A performance of an element may be improved by allowing the KTN waveguide and the light to interact with each other more.

Accordingly, it may be found that the optical phase shifter according to Experimental Example 3 may use the TM mode rather than the TE mode to improve the performance of the element, and may use a light having a long wavelength rather than a light having a short wavelength to improve the performance of the element.

Figure 22:
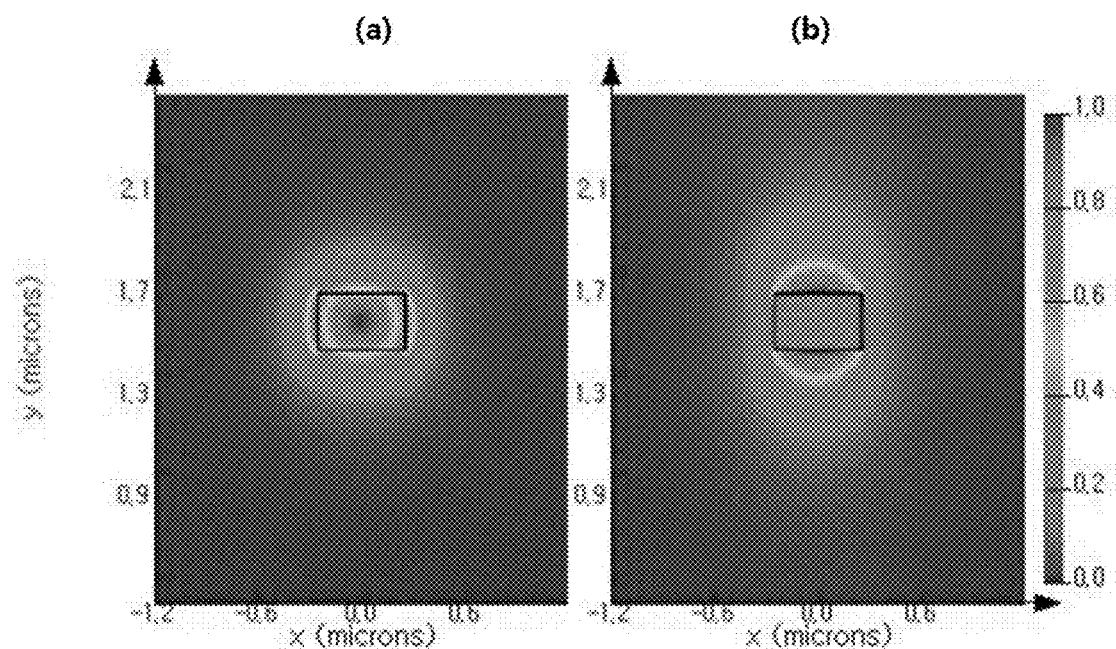
FIGS. 22 and 23 are views showing optical mode calculation results of an optical phase shifter according to Experimental Example 1 of the present invention.
Figure 23:
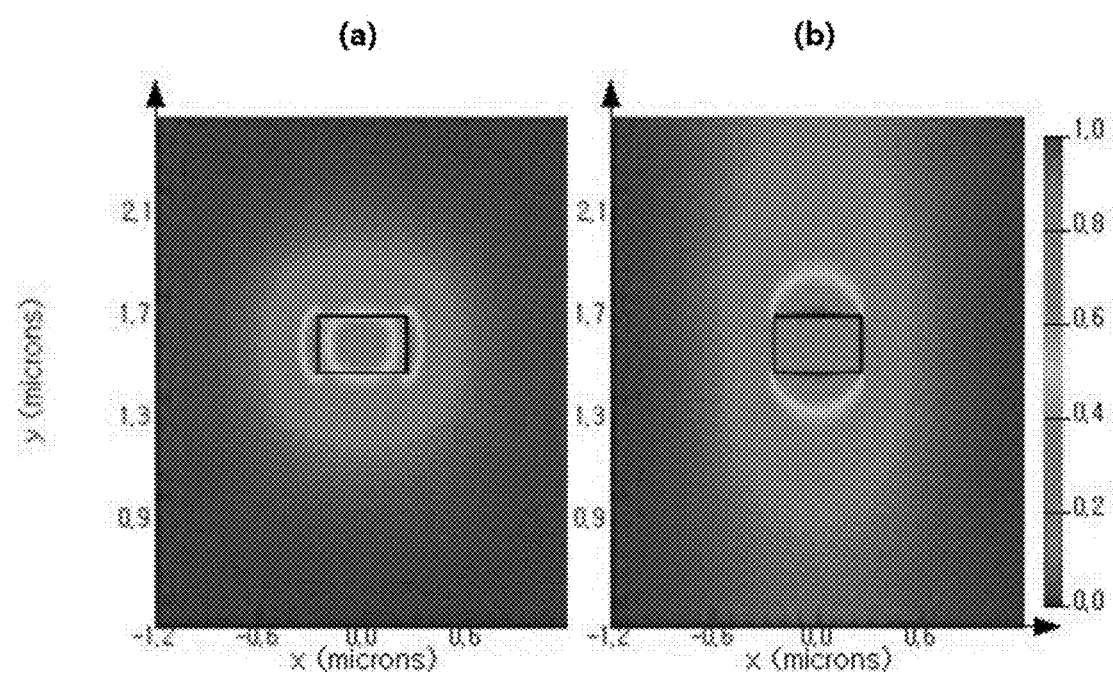

FIGS. 22 and 23 are views showing optical mode calculation results of an optical phase shifter according to Experimental Example 1 of the present invention.

Referring to FIGS. 22 and 23, after the optical phase shifter according to Experimental Example 1 is prepared, optical mode calculation results according to a wavelength are shown. In detail, FIGS. 22(a) and 23(a) show results of a transverse electric (TE) mode, and FIGS. 22(b) and 23(b) show results of a transverse magnetic (TM) mode. In addition, FIG. 22 shows results at a wavelength of 1.3 μm, and FIG. 23 shows results at a wavelength of 1.55 μm.

As shown in FIGS. 22 and 23, in a case of the TE mode, it may be found that a light is most constrained to a rib part, and the light spreads to both sides of a rib. In a case of the TM mode, it may be found that the light is most constrained to upper and lower parts of the rib. In addition, it may be found that a spreading degree of the light may be increased as a wavelength of the light becomes longer. In the case of the TE mode, it may be found that a constraining degree of the light may be increased as the wavelength of the light becomes shorter.

A performance of an element may be improved by allowing the KTN waveguide and the light to interact with each other more. In addition, since the spreading of the light to other places without being constrained to the KTN waveguide means that a loss amount is increased accordingly, an element with a small light spreading degree has an excellent performance. Accordingly, it may be found that the optical phase shifter according to Experimental Example 1 may use the TE mode rather than the TM mode to improve the performance of the element, and may use a light having a short wavelength rather than a light having a long wavelength to improve the performance of the element.

Figure 24:
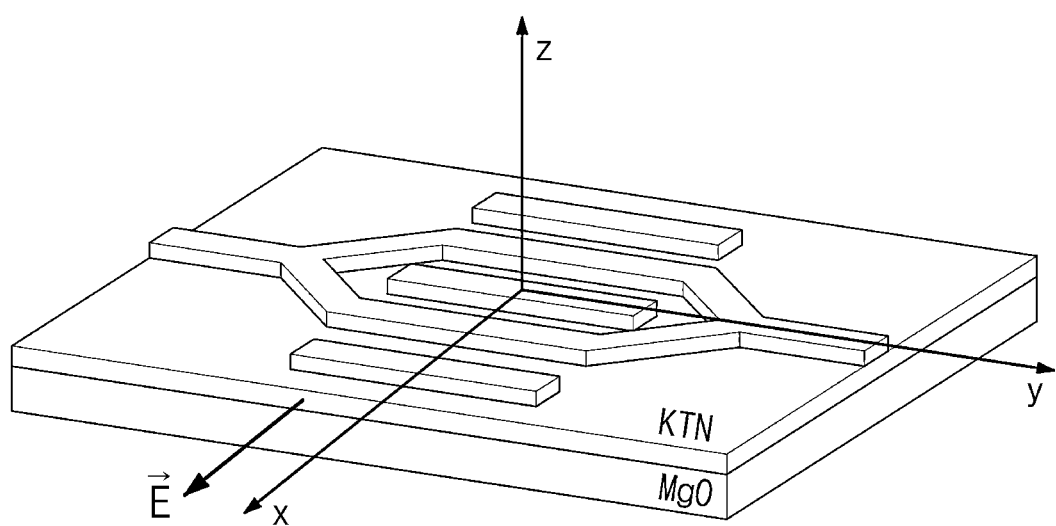
FIG. 24 is a view for describing an optical modulation element according to an experimental example of the present invention.

FIG. 24 is a view for describing an optical modulation element according to an experimental example of the present invention.

Referring to FIG. 24, in order to examine a performance of a KTN waveguide, a Mach-Zehnder optical modulator using the KTN waveguide was prepared. A length of an electrodes is 3 mm, and an inter-electrode distance is 10 μm. In addition, a wavelength of a light used was 1550 nm, and an external electric field was applied in an X-axis direction.

In addition, optical modulators using lithium niobate ($LiNbO_3$, LN) and barium titanate ($BaTiO_3$, BTO) waveguides were prepared. The optical modulator using the LN waveguide is defined as an optical modulator according to Comparative Example 1, and the optical modulator using the BTO waveguide is defined as an optical modulator according to Comparative Example 2.

Electro-optical coefficients for the optical modulators according to Experimental Example and Comparative Examples are summarized through [Table 1] below.

TABLE 1

| EO coefficient | Pockels, $r_{s1}$ (out of plane) [pm/V] | Pockels, $r_{eff}$ (in plane) [pm/V] | Kerr, s $[10^{-18}m^2/V^2]$ |
|---|---|---|---|
| Comparative Example 1 (LN) | — | 214.93 | — |
| Comparative Example 2 (BTO) | 1640 | 1429 | 2290 |
| Experimental Example (KTN) | 8000 | 5903 | 22000 |

The Pockels effect is an effect that a refractive index is changed in linear proportion to an electric field, and the Kerr effect is an effect that a refractive index is changed in proportion to a square of an electric field. A case where a polarization direction of KTN is perpendicular to a substrate is defined as "out of plane", and a case where the polarization direction of KTN is parallel to the substrate is defined as "in plane". When the electro-optic coefficients in [Table 1] are compared with each other, the optical modulator according to Comparative Example 1 (LN) may have the smallest the electro-optic coefficient, and values of the electro-optic coefficients may be large in an order of the optical modulator according to Comparative Example 2 (BTO) and the optical modulator according to Experimental Example (KTN). Since the electro-optical coefficient of the optical modulator according to Experimental Example (KTN) is significantly large, an optical phase shifter having a higher performance than the optical modulators according to Comparative Examples (LN, BTO) may be implemented.

Figure 25:
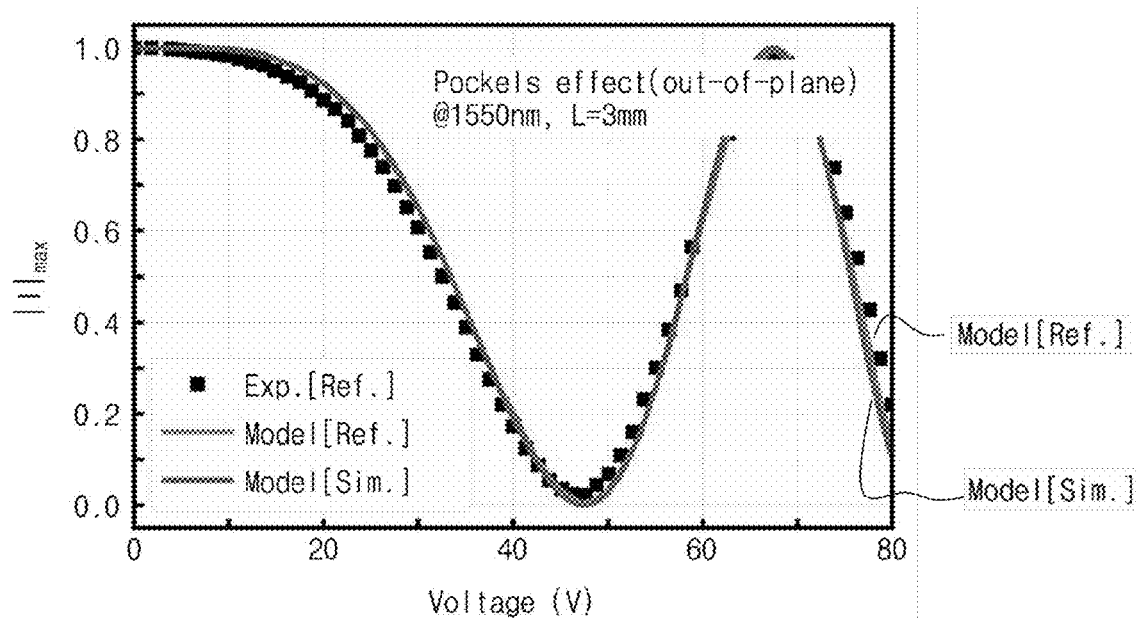
FIG. 25 is a view for describing a result of verifying an experimental value and a theoretical model of an optical phase shifter included in an optical modulator according to Comparative Example 2 of the present invention.

FIG. 25 is a view for describing a result of verifying an experimental value and a theoretical model of an optical phase shifter included in an optical modulator according to Comparative Example 2 of the present invention.

Referring to FIG. 25, an experimental value and a theoretical model of the optical phase shifter according to Comparative Example 2 were verified through the model described with reference to FIG. 24. As shown in FIG. 25, it was found that results of the experimental value and the theoretical model of the BTO optical phase shifter that is reported appear similar. Accordingly, it may be found that the model may be trusted.

Figure 26:
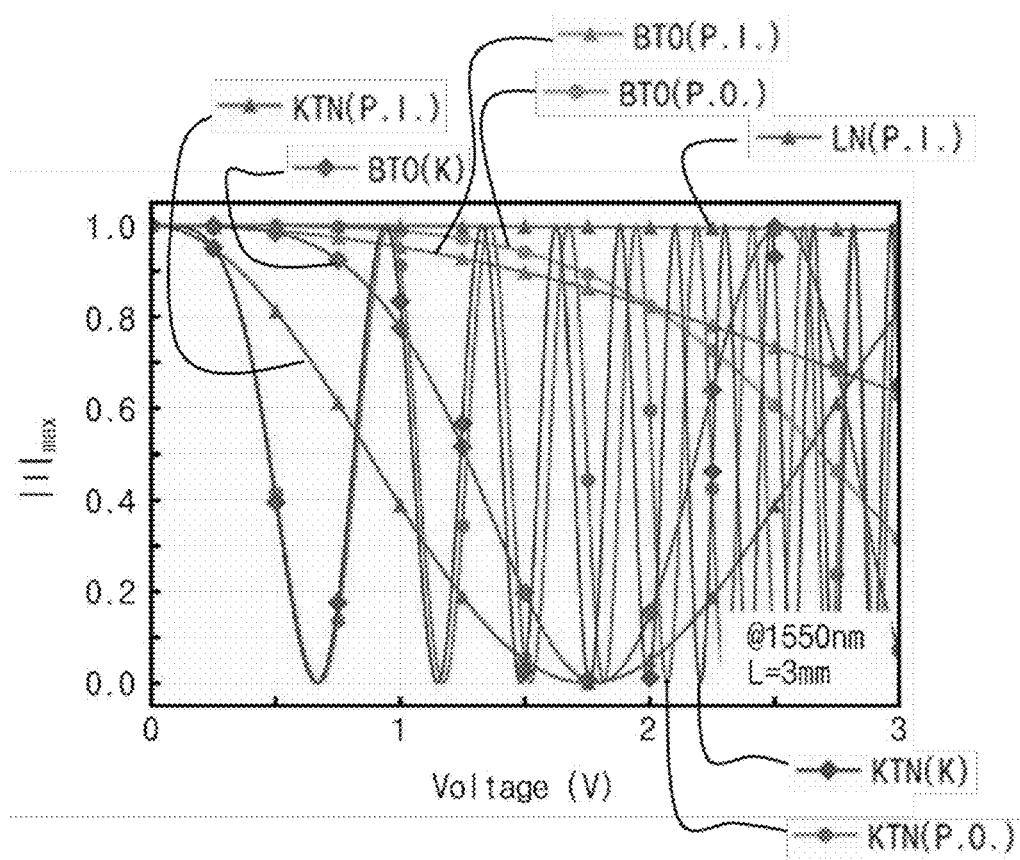
FIG. 26 is a graph showing a light output according to a voltage of optical phase shifters included in optical modulators according to Experimental Example and Comparative Examples of the present invention.

FIG. 26 is a graph showing a light output according to a voltage of optical phase shifters included in optical modulators according to Experimental Example and Comparative Examples of the present invention.

Referring to FIG. 26, after the optical phase shifter according to Experimental Example (KTN), the optical phase shifter according to Comparative Example 1 (LN), and the optical phase shifter according to Comparative Example 2 (BTO) are prepared, a light output obtained when a voltage is applied to each of the optical phase shifters is shown. As shown in FIG. 26, it may be found that the light output may be changed from 1 to 0 or 0 to 1 with a smaller applied voltage in an order of Comparative Example 1 (LN), Comparative Example 2 (BTO), and Experimental Example (KTN).

Figure 27:
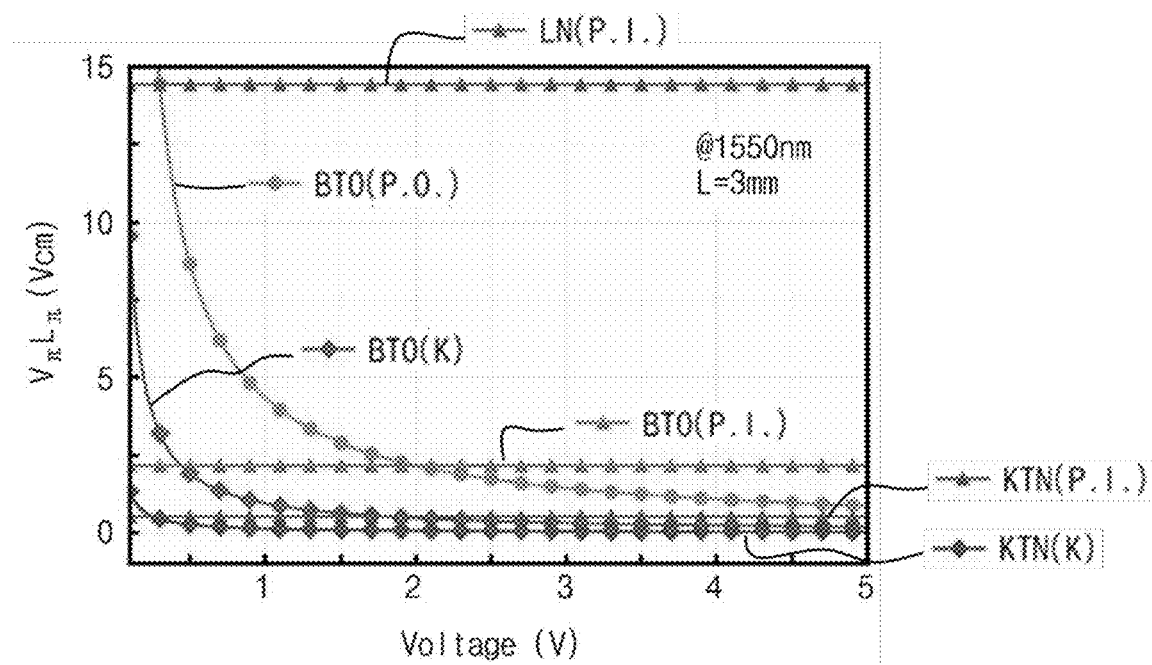
FIG. 27 is a graph for comparing performances of the optical phase shifters included in the optical modulators according to Experimental Example and Comparative Examples of the present invention.

FIG. 27 is a graph for comparing performances of the optical phase shifters included in the optical modulators according to Experimental Example and Comparative Examples of the present invention.

Referring to FIG. 27, after the optical phase shifter according to Experimental Example (KTN), the optical phase shifter according to Comparative Example 1 (LN), and the optical phase shifter according to Comparative Example 2 (BTO) are prepared, $V_nL_n$ according to a voltage was calculated for each of the optical phase shifters. In this case, $V_nL_n$ is an optical modulation efficiency, which is defined as multiplication of a voltage required to change a phase by 180 degrees and a length of the optical phase shifter, and since the optical phase shifter may be implemented with a lower voltage and a smaller length as a value of $V_nL_n$ becomes lower, the lower value means a better efficiency. As shown in FIG. 27, it may be found that the optical phase shifter according to Experimental Example (KTN) has a lower $V_nL_n$ value than each of the optical phase shifters according to Comparative Example 1 and Comparative Example 2 (LN, BTO).

Figure 28:
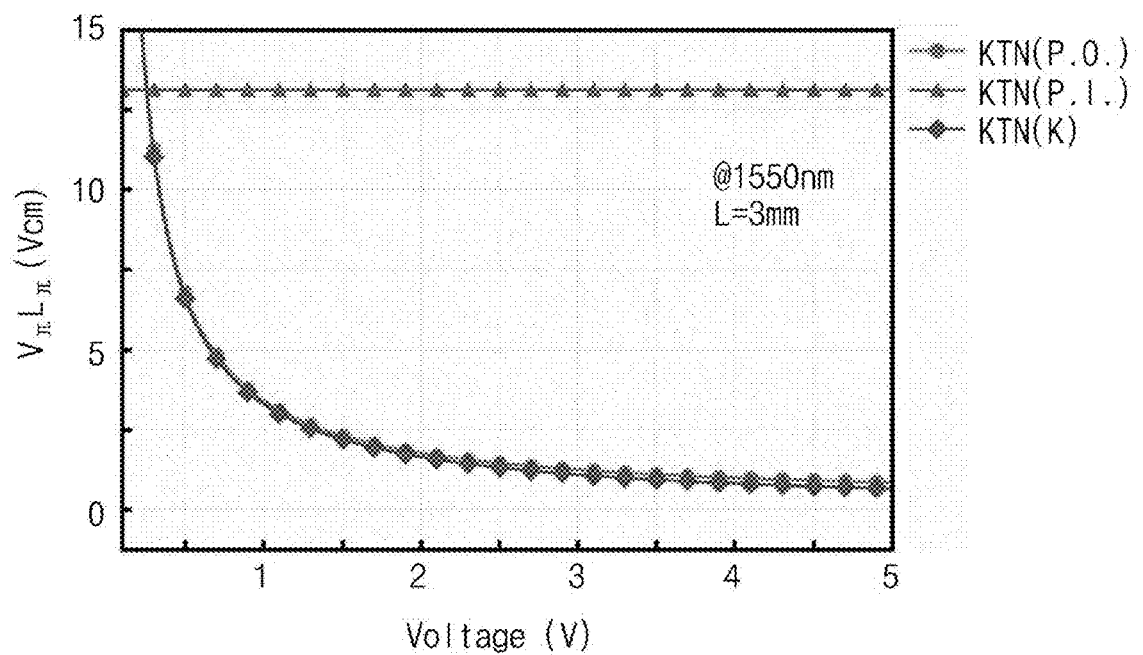
FIG. 28 is a graph showing a performance of the optical phase shifter included in the optical modulator according to Experimental Example of the present invention.

FIG. 28 is a graph showing a performance of the optical phase shifter included in the optical modulator according to Experimental Example of the present invention.

Referring to FIG. 28, a $V_nL_n$ value according to a voltage for the optical phase shifter according to Experimental Example is enlarged and shown. As shown in FIG. 28, it may be found that a large electro-optical effect and an excellent optical modulation efficiency are achieved in an order of the Pockels effect (in plane), the Pockels effect (out of plane), and the Kerr effect. It may be found that the optical phase shifter according to Experimental Example has an optical modulation efficiency of 0.05 Vcm or less, which is a high performance.

Although the exemplary embodiments of the present invention have been described in detail above, the scope of the present invention is not limited to a specific embodiment, and should be interpreted by the appended claims. In addition, it should be understood by those of ordinary skill in the art that various changes and modifications can be made without departing from the scope of the present invention.

What is claimed is:

1. An optical phase shifter comprising:
    a silicon substrate;
    a cladding layer disposed on the silicon substrate;
    an intermediate film disposed on the cladding layer;
    a KTN ($KTaNbO_3$) waveguide disposed on the intermediate film;
    a protective layer disposed on the intermediate film to cover the KTN waveguide; and
    first and second electrodes disposed on the intermediate film while being spaced apart from each other with the KTN waveguide interposed between the first and second electrodes;
    a first transition region that is adjacent to an optical input of an optical modulator;
    a second transition region that is adjacent to an optical output of the optical modulator; and
    a KTN region disposed between the first transition region and the second transition region,
    wherein a silicon waveguide is disposed inside the cladding layer while being spaced apart from the KTN waveguide with the intermediate film interposed between the silicon waveguide and the KTN waveguide,
    wherein an area of the silicon waveguide in the first transition region and the second transition region is wider than an area of the silicon waveguide in the KTN region, and
    wherein, in the KTN region, the silicon waveguide is not present inside the cladding layer.

2. The optical phase shifter of claim 1, wherein, when a voltage is applied to the optical phase shifter,
    an electric field is formed between the first electrode and the second electrode,
    the electric field causes a change in a refractive index of the KTN waveguide, and
    a phase of a light passing through the KTN waveguide is controlled by the change in the refractive index.

3. The optical phase shifter of claim 1, wherein
    all of the silicon substrate, the silicon waveguide, and the KTN waveguide extend in a first direction that extends from the optical input to the optical output.

4. The optical phase shifter of claim 3, wherein an area of the silicon waveguide between the first transition region and the KTN region is changed so as to be gradually narrowed or gradually widened in the first direction.

5. The optical phase shifter of claim 1, wherein
    the first transition region includes a first-first transition region that is adjacent to the optical input and a first-second transition region that is adjacent to the KTN region, and
    an area of the silicon waveguide in the first-first transition region is wider than an area of the silicon waveguide in the first-second transition region.

6. The optical phase shifter of claim 1, wherein
    the second transition region includes a second-first transition region that is adjacent to the optical output and a second-second transition region that is adjacent to the KTN region, and
    an area of the silicon waveguide in the second-first transition region is wider than an area of the silicon waveguide in the second-second transition region.

7. The optical phase shifter of claim 1, wherein
    the first electrode and the second electrode pass through the protective layer in a thickness direction while being spaced apart from the KTN waveguide,
    the first electrode is adjacent to one side of the KTN waveguide, and
    the second electrode is adjacent to an opposite side of the KTN waveguide.

8. The optical phase shifter of claim 1, wherein the optical phase shifter operates in a transverse electric (TE) mode among the transverse electric (TE) mode and a transverse magnetic (TM) mode.

* * * * *